(12) United States Patent
McKenney et al.

(10) Patent No.: US 8,788,543 B2
(45) Date of Patent: Jul. 22, 2014

(54) SCALABLE, CONCURRENT RESIZING OF HASH TABLES

(75) Inventors: Paul E. McKenney, Beaverton, OR (US); Joshua A. Triplett, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 12/779,726

(22) Filed: May 13, 2010

(65) Prior Publication Data

US 2011/0283082 A1     Nov. 17, 2011

(51) Int. Cl.
*G06F 7/00*     (2006.01)
*G06F 17/30*    (2006.01)

(52) U.S. Cl.
USPC ..................................... 707/803; 707/800

(58) Field of Classification Search
USPC .............................................. 711/202
See application file for complete search history.

(56) References Cited

U.S. PATENT DOCUMENTS

| | | | |
|---|---|---|---|
| 6,052,697 A * | 4/2000 | Bennett et al. | 1/1 |
| 6,370,619 B1 * | 4/2002 | Ho et al. | 711/129 |
| 7,287,131 B1 | 10/2007 | Martin et al. | |
| 7,349,926 B2 | 3/2008 | McKenney et al. | |
| 7,472,228 B2 | 12/2008 | McKenney et al. | |
| 7,533,377 B2 | 5/2009 | Appavoo et al. | |
| 2004/0083347 A1 | 4/2004 | Parson | |
| 2006/0002386 A1 * | 1/2006 | Yik et al. | 370/389 |
| 2006/0184519 A1 * | 8/2006 | Smartt | 707/3 |
| 2006/0265373 A1 | 11/2006 | McKenney et al. | |
| 2007/0061372 A1 | 3/2007 | Appavoo et al. | |
| 2008/0021908 A1 * | 1/2008 | Trask et al. | 707/100 |
| 2008/0033952 A1 | 2/2008 | McKenney et al. | |
| 2008/0049774 A1 * | 2/2008 | Swenson et al. | 370/412 |
| 2008/0126741 A1 * | 5/2008 | Triplett | 711/216 |
| 2009/0097654 A1 * | 4/2009 | Blake | 380/277 |
| 2009/0228514 A1 * | 9/2009 | Liu et al. | 707/102 |

OTHER PUBLICATIONS

Ori Shalev et al, "Split-Ordered Lists: Lock-Free Extensible Hash Tables", Journal of the ACM, vol. 53, No. 3, May 2006, pp. 379-405.*
Per-Ake Larson, "Dynamic Hash Tables", Communications of the ACM, Apr. 1988, vol. 31, No. 4, 12 pages.*
Shalev et al.; "Split-ordered lists: lock-free extensible hash tables"; Journal of the ACM, vol. 53, No. 3, 2006, pp. 379-405.

* cited by examiner

*Primary Examiner* — Uyen Le
(74) *Attorney, Agent, or Firm* — Walter W. Duft

(57) ABSTRACT

A system, method and computer program product for resizing a hash table while supporting hash table scalability and concurrency. The hash table has one or more hash buckets each containing one or more items that are chained together in a linked list. Each item in the hash table is processed to determine if the item requires relocation from a first bucket associated with a first table size to second bucket associated with a second table size. If the item requires relocation, it is linked to the second bucket without moving or copying the item in memory. The item is unlinked from the first bucket after waiting until there is no current hash table reader whose search of the hash table could be affected by the unlinking, again without moving or copying the item in memory.

25 Claims, 35 Drawing Sheets

SCALABLE, CONCURRENT RESIZING OF HASH TABLES

BACKGROUND

1. Field

The present disclosure relates to hash table data structures. More particularly, the disclosure concerns adaptive hash table resizing.

2. Description of the Prior Art

By way of background, hash tables provide useful data structures for many applications, with various convenient properties such as constant average time for accesses and modifications. When a hash table is shared for reading and writing by concurrent applications, some form of synchronization mechanism is required to maintain internal consistency. If there is a requirement for the concurrent applications to scale to many tasks on many processors, the hash tables they use must also scale. This means that the hash table synchronization mechanism must support scalability in addition to concurrency. In some cases, there may be a further need for dynamic hash table resizing in order to improve performance, reduce memory utilization, or for other reasons. Providing support for hash table resizability, scalability and concurrency may therefore be desirable.

SUMMARY

A system, method and computer program product are provided for resizing a hash table while supporting hash table scalability and concurrency. The hash table may have one or more hash buckets each containing one or more items that are chained together in a linked list. Each item in the hash table may be processed to determine if the item requires relocation from a first bucket associated with a first table size to second bucket associated with a second table size. If the item requires relocation, it may be linked to the second bucket without moving or copying the item in memory. The item may be unlinked from the first bucket after waiting until there is no current hash table reader whose search of the hash table could be affected by the unlinking, again without moving or copying the item in memory.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

Figure 1A:
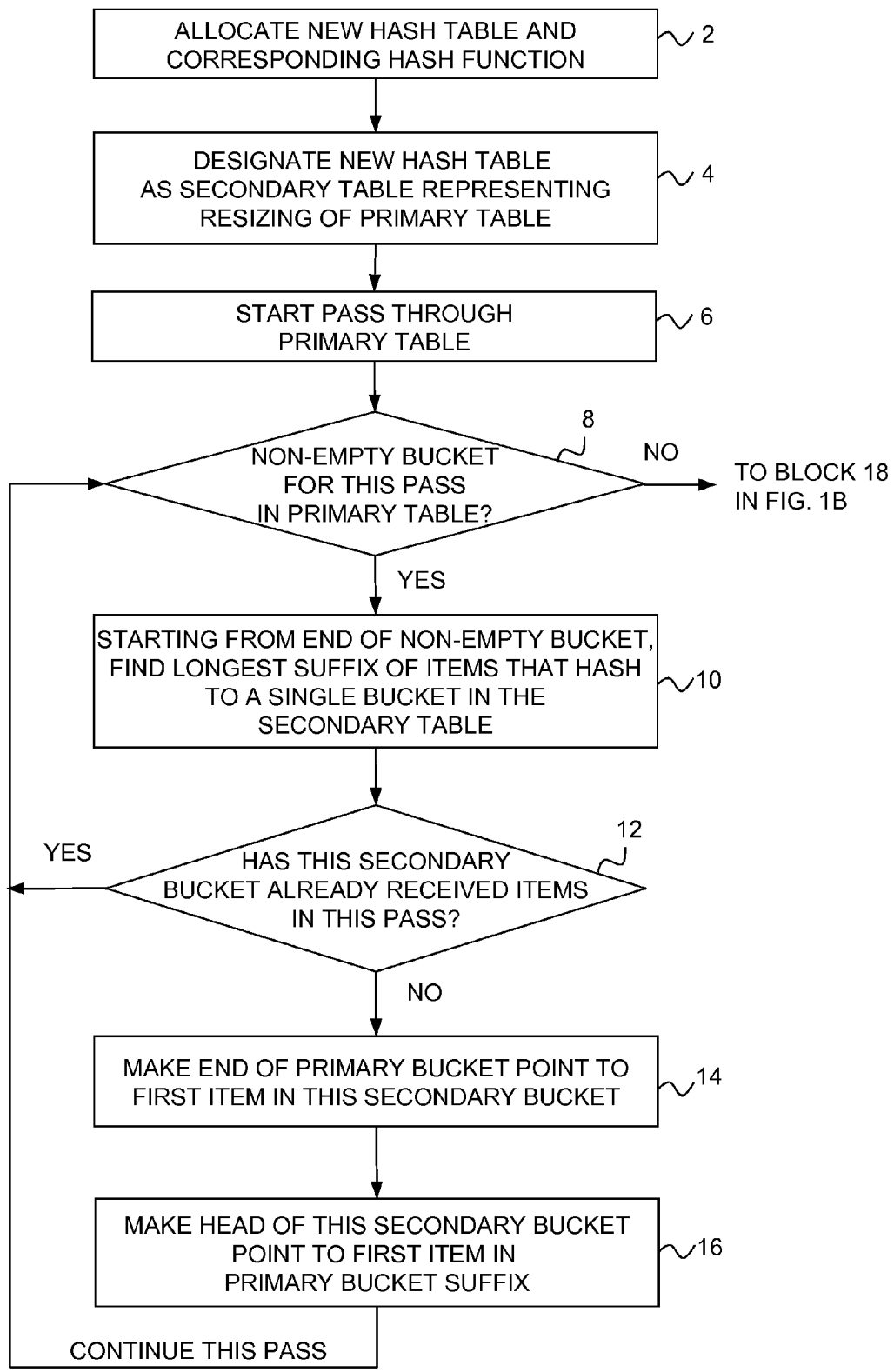
FIG. 1A-1B represent a flow diagram showing a first example embodiment for resizing a hash table.

Example embodiments will now be described for dynamically resizing hash tables that are accessible by concurrent applications in a manner that allows such applications to scale to many tasks (e.g., processes, threads, etc.) on many processors. The need to dynamically resize a hash table stems from the fact that the performance and suitability of hash tables depend heavily on choosing the appropriate size for the table. Making a hash table too small will lead to excessively long hash chains and poor performance. Making a hash table too large will consume too much memory, reducing the memory available for other applications or performance-improving caches, and increasing hardware requirements. Many systems and applications cannot know the proper size of the hash table in advance. Software designed for use on a wide range of system configurations with varying needs may not have the option of choosing a single hash table size suitable for all supported system configurations. Furthermore, the needs of a system may change at run time due to numerous factors, and software must scale both up and down dynamically to meet these needs. For example, in a system that supports virtual computing environments, the ability to shrink a hash table can be particularly important so that memory can be reallocated from one virtual environment to another.

Supporting the dynamic resizing of concurrent hash tables requires different approaches according to the synchronization mechanism used to facilitate concurrent hash table operations. Some existing synchronization mechanisms for supporting hash table concurrency primarily make use of mutual exclusion in the form of locks. Resizing a hash table based on mutual exclusion requires relatively little work. The resizing operation simply acquires the appropriate locks to exclude concurrent reads and writes, then moves items to a new table. Unfortunately, lock-based synchronization techniques do not scale well due to lock contention. Moreover, any form of locking may impact performance even in the absence of contention due to the use of expensive atomic instructions, and due to bypassing the cache to read from memory. As a result, adding more processors to such a system does not provide a proportional increase in performance. Moreover, when a hash table guarded by a lock-based synchronization mechanism is resized by locking the table, all table accesses will be blocked while the resizing occurs.

Scalability allows concurrent applications to scale to many threads on many processors. However, a compatible synchronization mechanism is required for shared data structures, such as hash tables. One prior art solution for supporting scalable concurrent hash tables comes in the form of Read-Copy Update (RCU). RCU provides a synchronization mechanism for concurrent programs, with very low overhead for readers. Thus, RCU works particularly well for data structures with significantly more reads than writes. This category includes many data structures commonly used in operating systems and applications.

Existing RCU-based hash tables use open chaining, with an RCU-protected linked list being provided for each hash bucket. Various algorithms have been used in RCU-based hash tables for moving hash items between hash buckets due to a change in the hash key. Such operations make RCU-based hash tables more broadly usable in place of those based on mutual exclusion. This work, however, requires copying the item as part of moving it, making it difficult or impossible to hold persistent references to hash table items in memory.

A deficiency of existing RCU-based hash tables is that they do not provide the ability to resize because they cannot exclude readers and thus they must cope with concurrent reads while resizing. This gap in available solutions forces programs to choose between scalable concurrent hash tables and resizable adaptive hash tables.

Overview

The example hash table resizing embodiments disclosed herein may be used to resize a hash table without excluding concurrent hash table readers and without blocking them. The resizing embodiments are thus suitable for hash tables that are both scalable and concurrent, such as an RCU-based hash table. The embodiments may also be used with lock-based hash tables. However, the ability to resize a hash table without excluding or blocking readers guarantees fully deterministic access for readers, as required by real-time workloads. The resizing operation may result in hash table items being remapped from a first bucket associated with a first table size (the original table size) to a second bucket associated with a second table size (the final table size). Such remapping may be performed without moving or copying the items in memory, thus allowing readers to maintain persistent references to hash table items. Readers may access hash table items without the use of locks, memory barriers, or other expensive instructions, and see the items on well-formed linked lists. Again, however, locks or other mutual exclusion operations are not precluded and may be used if desired. Using a cross-linking technique, each item may be logically relocated by first linking the item to the second bucket and thereafter unlinking the item from the first bucket after waiting until there is no current reader whose search of the hash table could be affected by the unlinking. The terms "linking" and "unlinking" with respect to a hash table item encompass both direct linking and unlinking of the item as a separate, individual entity (e.g. by setting a pointer to or from the item), and indirect linking and unlinking of the item by virtue of the item being a member of a chain of items that is linked or unlinked as a group (e.g., by setting a pointer to or from an item at the beginning or end of the chain), which may expedite resizing. In either case, linking an item to a particular hash bucket results in the item becoming part of the bucket's linked list that can be traversed by readers of that bucket. Conversely, unlinking an item from a particular hash bucket results in the item being isolated from the bucket's linked list so that there are no pathways from or to other items in the bucket that can be traversed by readers of that bucket to either reach the item or to return to the linked list from the item. For each item (or a chain of items) to be relocated, the second bucket may be identified using a hash function based on the final table size. Linking the item (by itself or as part of a chain of items) may be performed by prepending or appending the item (or a chain of items) to the second bucket. Unlinking the item (by itself or as part of a chain of items) may be performed by unlinking the item (or a chain of items) from the first bucket. During the resizing operation, readers that are searching the first bucket may perform a search of the second bucket if they do not find the item(s) they are looking for in the first bucket.

As indicated, following the linking operation and prior to the unlinking operation, the resizing operation waits until there is no current reader whose search of the hash table could be affected by the unlinking. A read-Copy Update (RCU) implementation may be used to provide the waiting operation, with minimal overhead on the read side. An RCU implementation will wait for the expiration of a grace period which guarantees that all hash table readers that began a search of the hash table before commencement of the resizing operation have completed those searches. Note that there may be no such readers, in which case there may be no (or very little) wait time, or there may be one or more of such readers, in which case the wait time may increase. The grace period may be determined in any suitable way, such as by forcing the reader(s) to be rescheduled or by waiting for an indication from the reader(s) that searching has completed, or by determining that there was no active reader when the resizing operation began, or at least no reader that was actively traversing a bucket containing the item(s) being unlinked. Non-RCU wait operations that are semantically equivalent will also work. Note that the waiting operation need not prevent new readers from starting their searches after the resizing operation begins. The waiting operation need only wait for all pre-existing readers (e.g., 0, 1, 2, 3 . . . n readers) who began their searches prior to the onset of resizing.

One way that hash table resizing may be performed is by mapping the items in the buckets of a first hash table (the original table) to the buckets of a second hash table (the final table), where the second hash table uses a different hash function (and thus a different mapping). The second hash table need not have the same number of buckets as the first, thus allowing a resizing of the first table. In general, the technique will work for any two hash tables and hash functions. According to this embodiment, each first bucket involved in logically relocating an item will be in the first hash table and each second bucket will be in the second hash table. Insofar as the second hash table will supplant the first hash table, it is assumed that each item will be relocated from a first bucket in the first hash table to a second bucket in the second table. For each item, the second bucket may be identified using a hash function based on the second table size.

Another way that hash table resizing may be performed is by resizing a hash table in place without using a second hash table. The items in the hash table may then be mapped from a first bucket in the hash table to a second bucket in the same table. Resizing in place may be used to either increase or decrease the size of a hash table.

Enlarging a hash table in place may be performed by allocating additional memory to the hash table and adding one or more additional buckets. According to this embodiment, each first bucket involved in logically relocating an item will be an original bucket in the hash table before resizing and each second bucket will be one of the additional buckets added during resizing. During resizing, each item will either remain in a first bucket or relocate to a second bucket.

Shrinking a hash table in place may be performed by removing one or more buckets and decreasing a memory allocation to the hash table. According to this embodiment, each first bucket involved in logically relocating an item will be an original bucket in the hash table before resizing that will be removed during resizing. Each second bucket will be an original bucket that remains following resizing. During resizing, each item in a first bucket will be relocated to a second bucket.

Also disclosed is an optimized hashing approach for hash table resizing wherein a hash table may be resized by an integral factor, such as power of two. This technique facilitates resizing in place. A variation on hashing is further disclosed that keeps buckets sorted by key. Also disclosed is a technique for resizing a hash table to the same size in order to change its hash function.

Any hash table algorithm must make use of a hash function that maps items to hash buckets based on their key. The same key will always hash to the same bucket. Different keys will ideally hash to different buckets, but may map to the same bucket, requiring some kind of conflict resolution. Open chaining is one such conflict technique wherein each hash bucket has a linked list of items that hash to that bucket. The disclosed technique works well with hash tables using open chaining With some modifications, the disclosed technique will also work for closed chaining, which involves using a secondary hash function to iterate through a series of alternative buckets until finding an empty bucket. Note, however, that the embodiments for resizing a hash table in place require open chaining and the above-mentioned constraints on the resize factor.

Resizing with Primary and Secondary Hash Tables

Figure 1B:
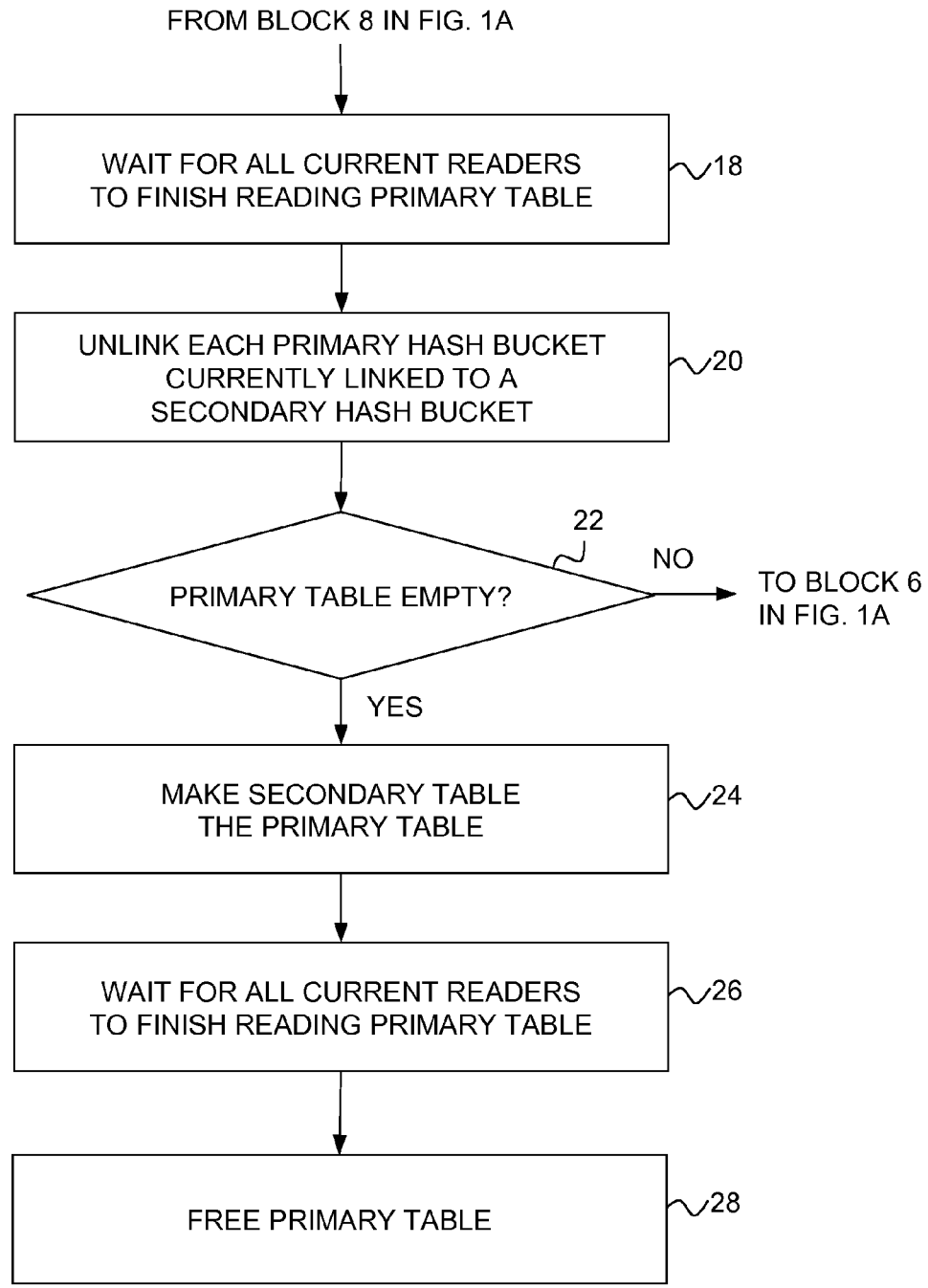

FIGS. 1A-1B illustrate a flow diagram showing example operations that may be used to perform hash table resizing. In this embodiment, a primary hash table is resized by creating a secondary hash table of different size and relocating the hash buckets from the primary table to the secondary table without moving or copying them in memory. In block 2, a new hash table is allocated in memory and a corresponding hash function is generated. The size of the new hash table is selected according to whether the primary hash table is being increased or decreased in size. In block 4, the new hash table is designated as a secondary hash table representing a resizing of the primary table. This allows readers to locate and search the secondary hash table during read operations (see below).

In block 6, a pass is started through the primary hash table in which items of one or more hash buckets in the primary hash table will be relocated to the secondary hash table. Block 8 checks to see if there is a non-empty bucket in the primary hash table. If there is, block 10 is implemented to identify a suffix of one or more items (starting from the end of the non-empty bucket) that can be relocated to a single bucket of the secondary hash table. In order to make this determination, the key of each item in the suffix is checked to determine the bucket it will hash to in the secondary hash table. In block 12, a check is made to determine if the secondary bucket has already received items in the current pass. This check avoids additional complexity during subsequent stages of the resizing operation, particularly in blocks 14 and 16 described below. It should be noted that a constraint on resizing (see below) may be used to ensure that the determination of block 12 always produces a false result. If block 12 produces a true result, meaning that the secondary bucket has already received items in this pass, processing returns to block 8 to check another non-empty bucket in the primary hash table (if one exists).

If it is determined in block 12 that the secondary bucket has not received items in the current pass, processing proceeds to blocks 14 and 16, which collectively prepend the primary bucket suffix to the secondary bucket. In block 14, the last item of the suffix is made to point to the first item in the secondary bucket (e.g., by setting the item's "next" pointer). If the secondary bucket contains no items, the last item in the suffix can be can be linked to NULL or the like to indicate that it is the last item in the secondary bucket. This will be a no-op (no operation) in most cases because the item's "next" pointer already terminates the primary bucket and will thus be a NULL pointer or the like. One technique that may be used to implement block 14 is to copy the existing head pointer for the secondary bucket (the pointer used to find the first item in the bucket) and copying it to the "next" pointer of the last item in the primary bucket suffix. In this way, whatever the secondary bucket head pointer was pointing to will now be pointed to by the suffix's last item. In block 16, the head pointer of the secondary bucket is made to point to the first item in the primary bucket suffix. At this point, the suffix items in the primary bucket will have been added to the secondary bucket in the secondary hash table while still leaving them accessible from the primary bucket in the primary hash table. The suffix will thus be cross-linked to both the primary and secondary buckets.

As an alternative to the suffix prepend operations of blocks 14 and 16, the primary bucket suffix could be appended to the secondary bucket. To do this, the "next" pointer of the last item in the secondary bucket would be changed to point to the first item in the primary bucket suffix. The last "next" pointer in the primary bucket would remain unchanged (e.g., pointing to NULL). A disadvantage of this approach is that there might not be tail pointers for the buckets, such that finding the end of the secondary bucket might prove inefficient. Note that finding the end of the primary bucket per block 14 does not present a comparable problem because that item was already located in block 10. A further disadvantage of appending is that it reorders the bucket items, which is disruptive if the buckets are sorted. It will be appreciated that moving items from the beginning of the primary bucket (i.e., as prefixes rather than suffixes) would solve the sorting problem but could potentially disrupt concurrent traversals of the primary bucket and prevent readers from finding later items.

Processing returns to block 8 following the completion of block 16. If there are no remaining non-empty buckets for the current pass, processing proceeds to block 18 in FIG. 1B. In block 18, the resizing operation waits for all current readers (if any) who may have begun searching the primary hash table prior to the start of resizing to finish their search. Block 20 then unlinks each primary hash bucket that is currently linked to a secondary hash bucket by separating each primary bucket suffix that was relocated in blocks 14 and 16 from its primary bucket. This removes the cross-linking and makes the relocated items appear only in the secondary hash table.

Performing the waiting operation of block 18 before block 20 ensures that the current readers that already began looking for one or more items in a relocated suffix using the hash function associated with the primary hash table will find them before the suffix is unlinked from its primary bucket. New readers who commence their searches after the start of resizing can avoid this problem by noting that a resizing operation has commenced and performing a second search of the secondary hash table using its corresponding hash function. These new readers will see the items in the secondary hash table if they do not see them in the primary hash table.

Block 18 may be implemented using any suitable technique, including by waiting for an RCU grace period that waits for each current reader task (if any) to pass through a quiescent state, such as a context switch in which the reader task is not actively running. This may be done by forcing all current readers to be rescheduled (e.g., by having the resize operation reschedule itself on all processors). Alternatively, as described in more detail below in connection with FIGS. 7-8, the resize operation could wait for an indication from each reader that it has finished searching (such as an indication that the reader has left an RCU-protected critical section). Other techniques that are semantically equivalent may also be used to implement block 18.

In block 22, a check is made to determine if the primary hash table is empty. If it is not, processing returns to block 8 in FIG. 1A and another pass is taken through the primary hash table. Once all passes have been completed and it is determined in block 22 that the primary hash table is empty, processing proceeds to block 24 and the secondary hash table is now designated as the primary hash table. At this point, the original hash table is no longer needed and readers may discontinue searching it. In block 26, the resizing operation waits for all current readers (if any) who may still be searching the original hash table to finish such searches. The waiting operation may be the same as that used in block 18. Once each such reader has finished searching the original hash table, and thus can maintain no references thereto, the primary hash table may be freed and its memory reclaimed.

Hash Table Resizing Example

Figure 2A:
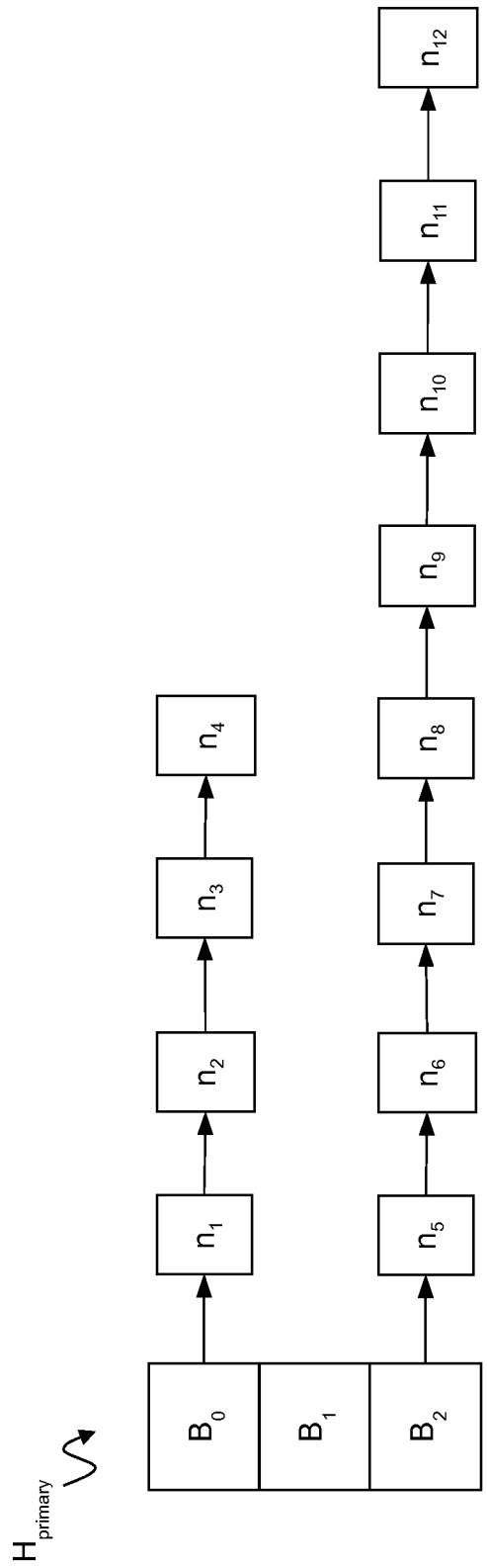
FIGS. 2A-2R are diagrammatic representations showing individual steps of the hash table resizing embodiment of FIGS. 1A-1B.

The operations of FIGS. 1A-1B may be further understood by way of an example hash table resizing operation. With reference now to FIGS. 2A-2R, FIG. 2A depicts the initial state of a primary hash table $H_{primary}$ that is to be resized (e.g., increased in size). For ease of illustration, the primary hash table $H_{primary}$ is shown as having three hash buckets $B_0$, $B_1$ and $B_2$. Bucket $B_0$ has a four items implemented as list nodes $n_1$, $n_2$, $n_3$ and $n_4$. Bucket $B_1$ is an empty bucket. Bucket $B_2$ contains eight items implemented as list nodes $n_5$, $n_6$, $n_7$, $n_8$, $n_9$, $n_{10}$, $n_{11}$ and $n_{12}$.

Figure 2B:
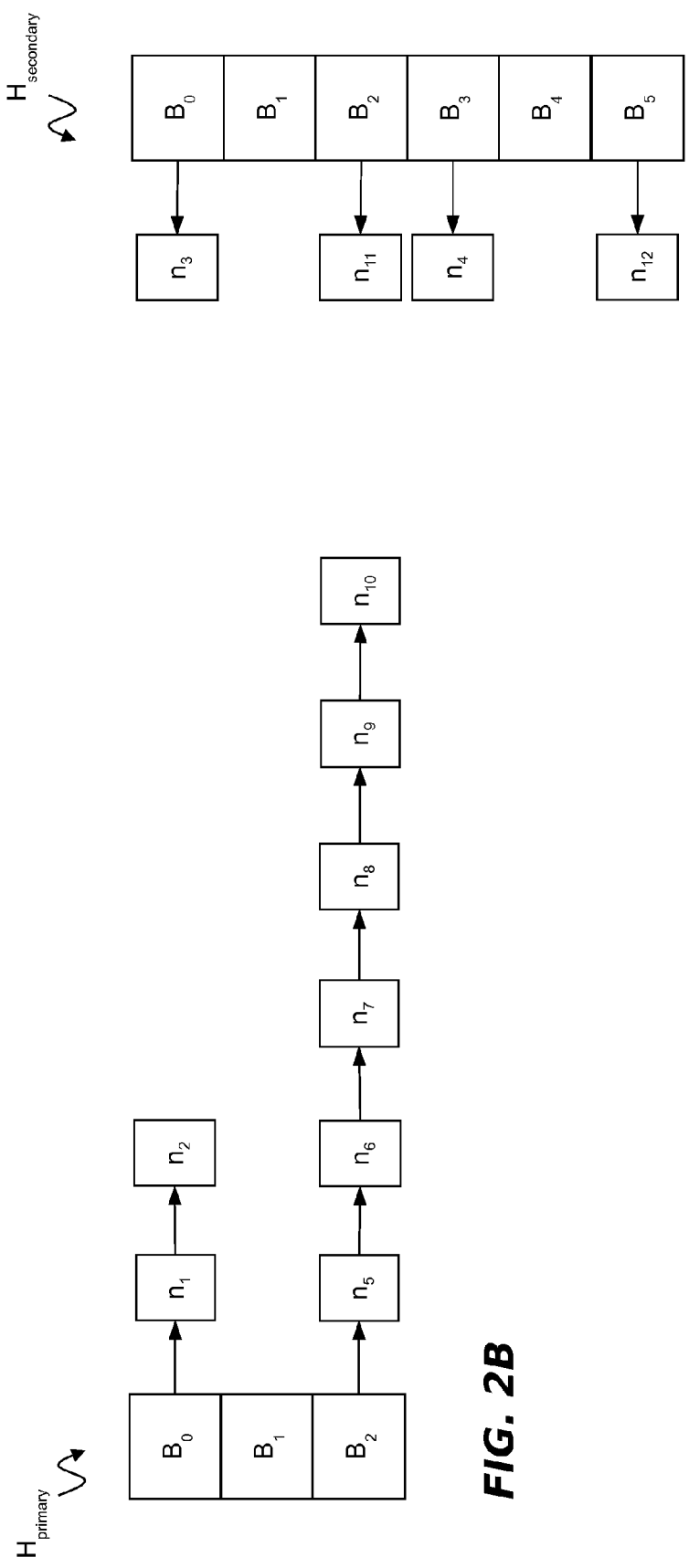

In FIG. 2B, a new hash table has been allocated, assigned a corresponding hash function, and designated as a secondary hash table $H_{secondary}$ per blocks 2 and 4 of FIG. 1A. The secondary hash table $H_{secondary}$ is double the size of the primary hash table $H_{primary}$, and thus has six hash buckets $B_0$, $B_1$, $B_2$, $B_3$, $B_4$ and $B_5$. FIG. 2B further shows a state of the resizing operation in which two passes have already been made through the primary table $H_{primary}$ per blocks 6-20 of FIGS. 1A-1B. In the first pass, node $n_4$ of primary hash bucket $B_0$ was relocated to secondary hash bucket $B_3$ and node $n_{12}$ of primary hash bucket $B_2$ was relocated to secondary hash bucket $B_5$. In the second pass, node $n_3$ of primary hash bucket $B_0$ was relocated to secondary hash bucket $B_0$ and node $n_{11}$ of primary hash bucket $B_2$ was relocated to secondary hash bucket $B_2$.

Figure 2C:
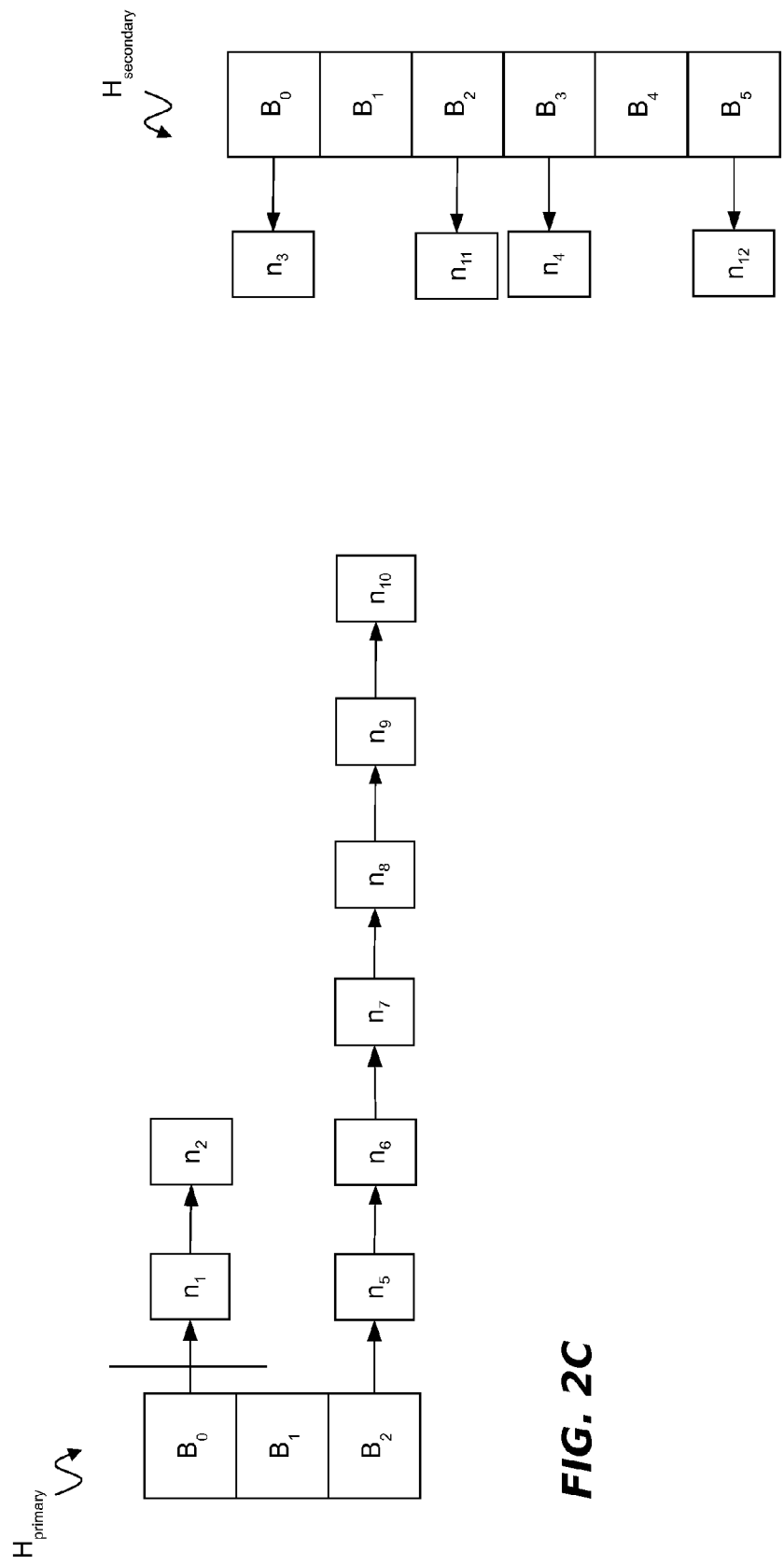
Figure 2D:
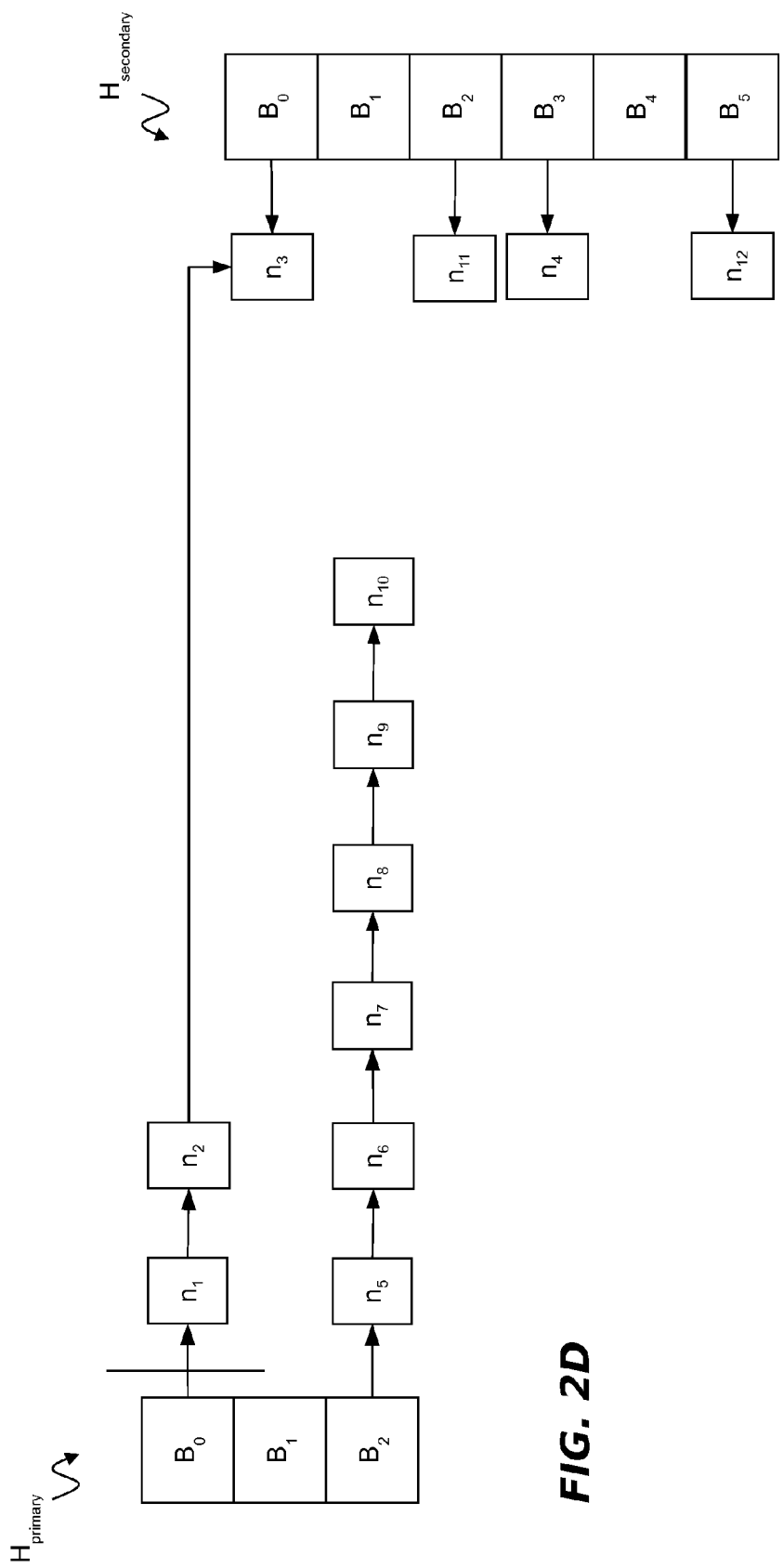
Figure 2E:
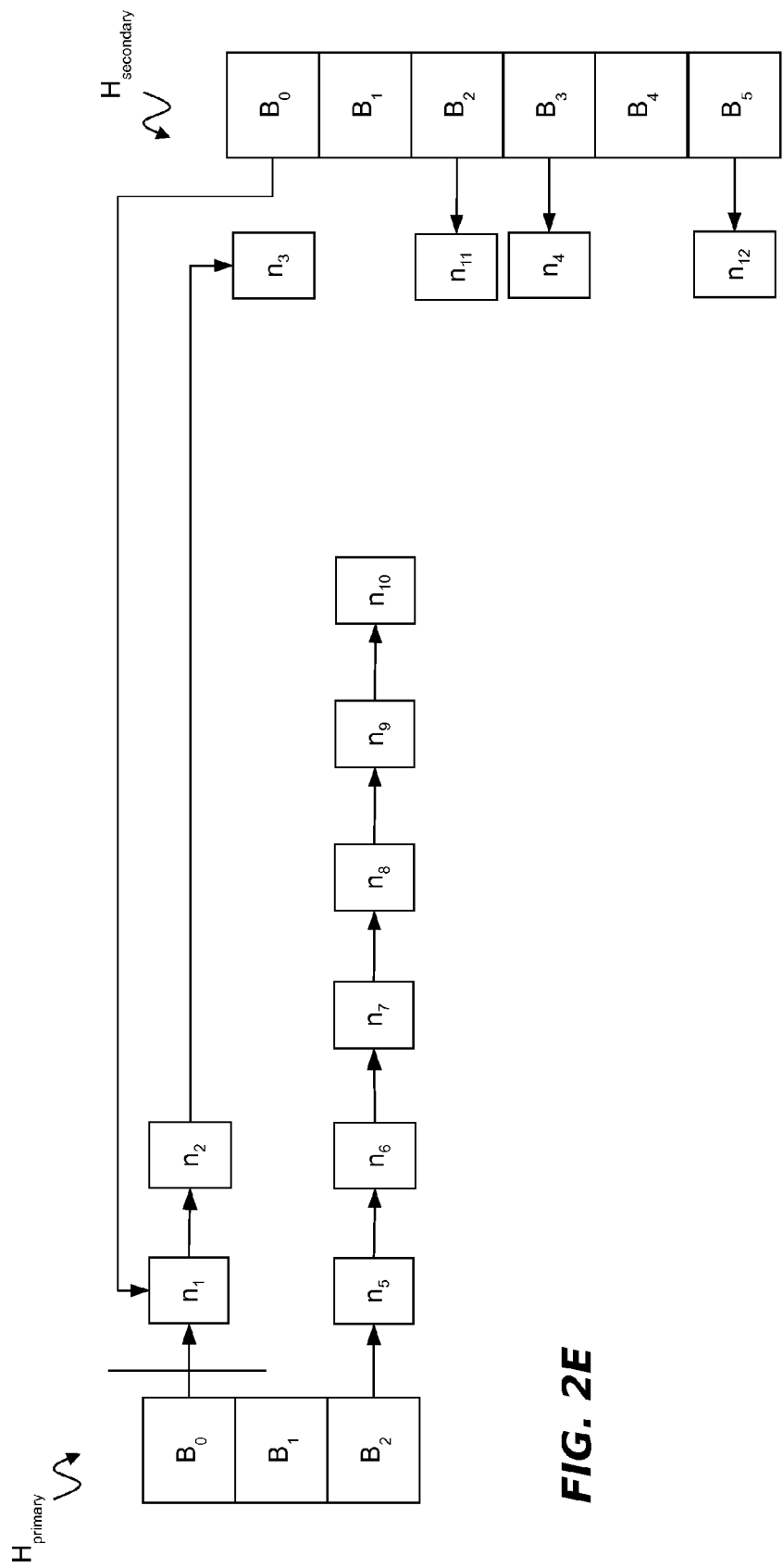

In FIG. 2C (which begins the third pass through the primary hash table $H_{primary}$), the non-empty primary bucket $B_0$ has been determined by block 10 of FIG. 1A to contain two items $n_1$ and $n_2$ that hash to secondary bucket $B_0$. These items represent a suffix starting from the end of primary bucket $B_0$ and stopping at the vertical line to the left of element $n_1$. In FIG. 2D, block 14 of FIG. 1A has been performed and item $n_2$ representing the end of primary bucket $B_0$ (and the last item in the primary bucket suffix) has been linked to point to the first item $n_3$ in secondary bucket $B_0$. In FIG. 2E, block 16 of FIG. 1A has been performed and the head of secondary bucket $B_0$ has been made to point to the first item $n_1$ in the primary bucket suffix.

Figure 2F:
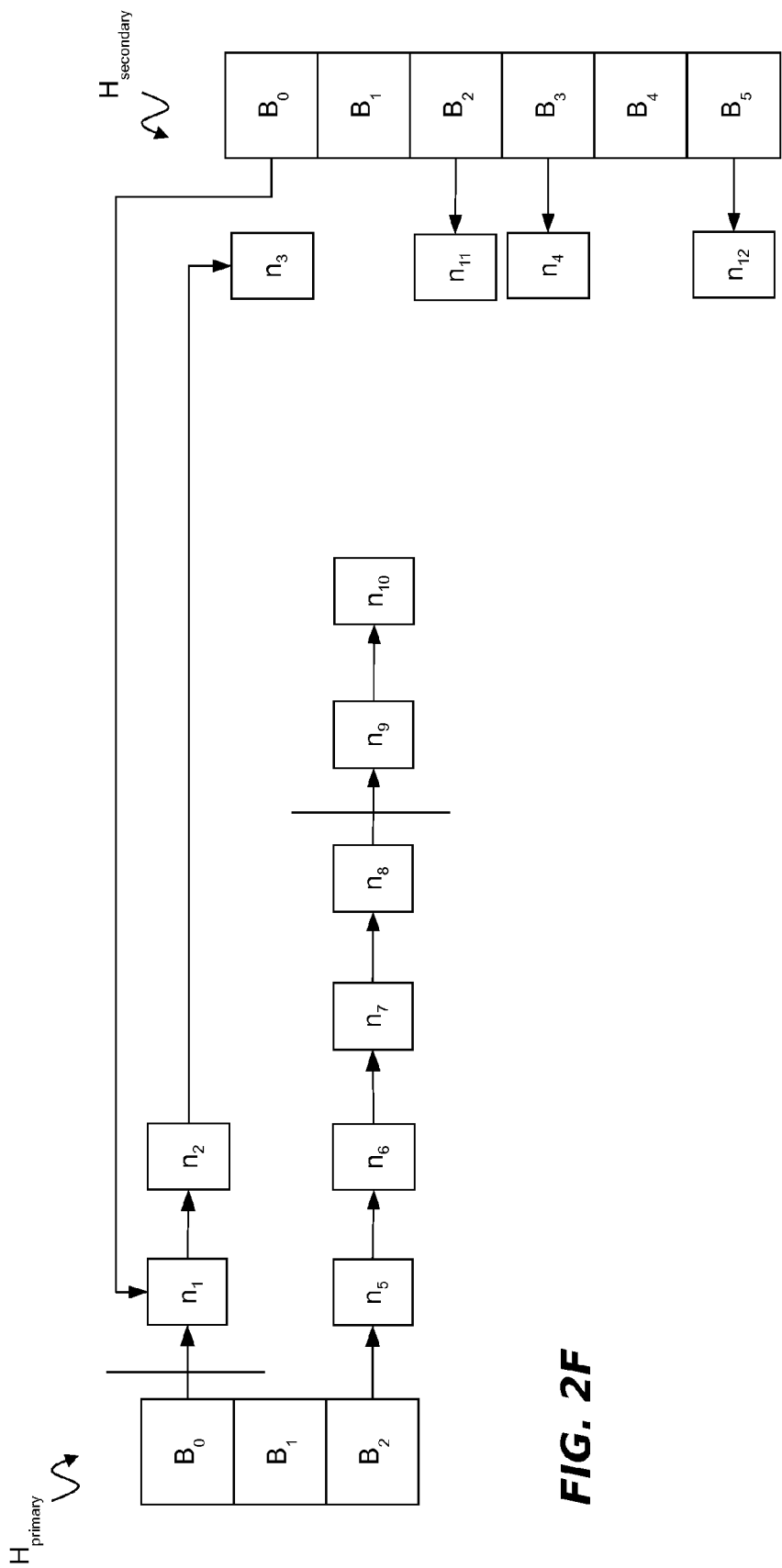
Figure 2G:
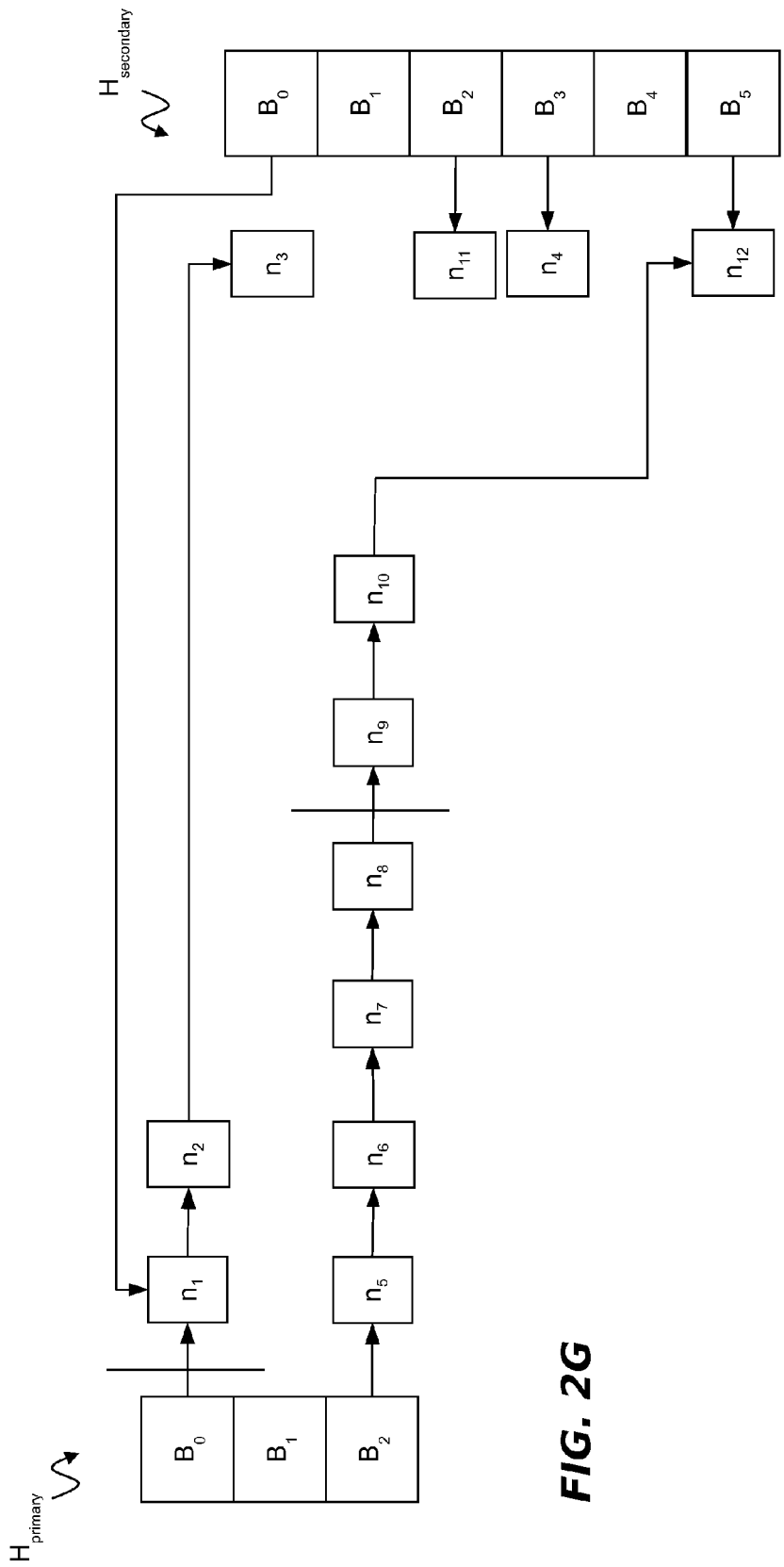
Figure 2H:
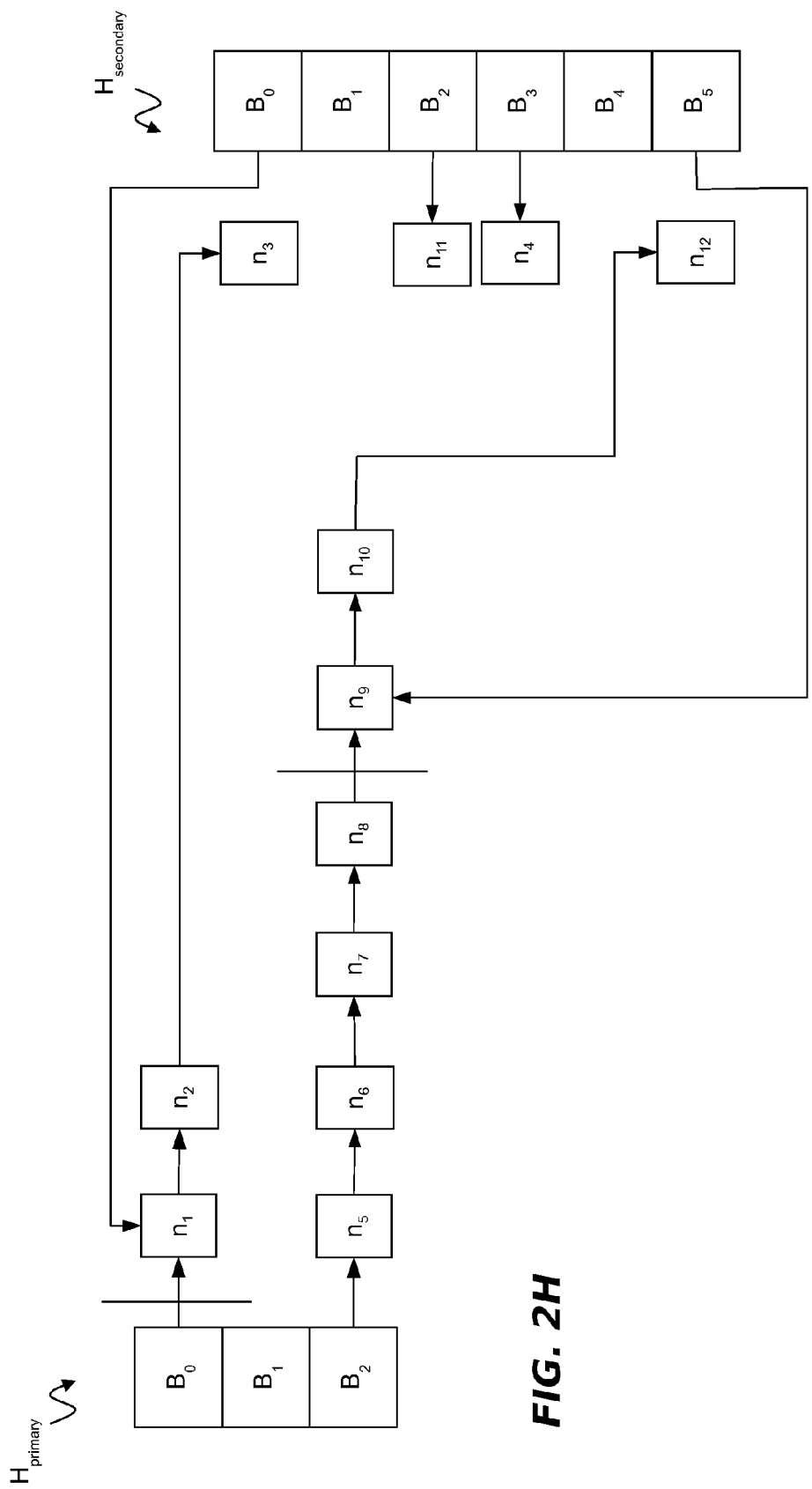
Figure 2I:
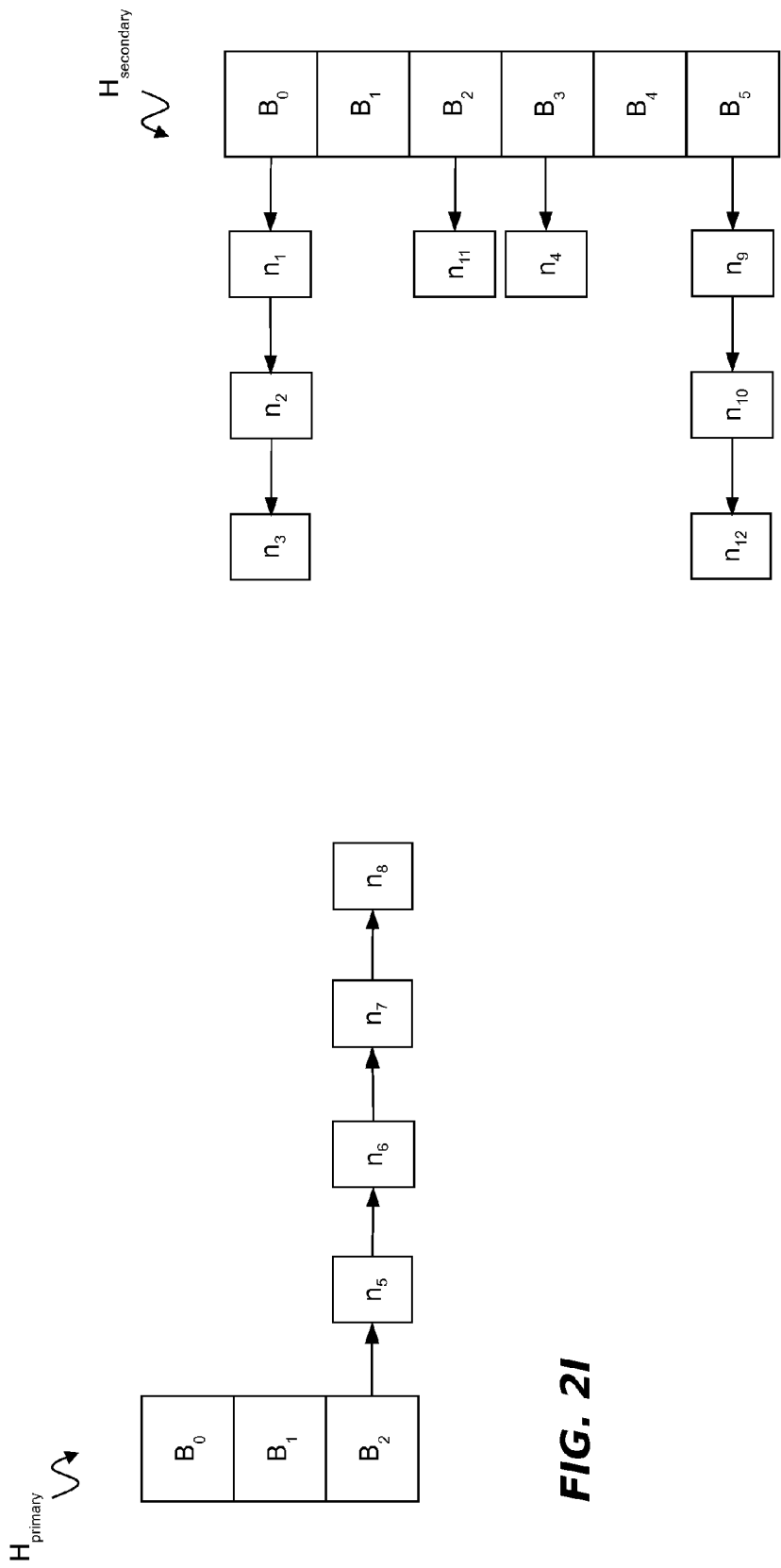

FIG. 2F shows a continuation of the third pass through the primary hash table $H_{primary}$ to identify suffixes of interest. In particular, block 10 of FIG. 1A has been performed and the non-empty primary bucket $B_2$ has been determined to contain two items $n_9$ and $n_{10}$ that hash to secondary bucket $B_5$. These items represent a suffix starting from the end of primary bucket $B_2$ and stopping at the vertical line to the left of element $n_9$. In FIG. 2G, block 14 of FIG. 1A has been performed and item $n_{10}$ representing the end of the primary bucket $B_2$ (and the last item in the primary bucket suffix) has been linked to point to the first item $n_{12}$ in secondary bucket $B_5$. In FIG. 2H, block 16 of FIG. 1A has been performed and the head of secondary bucket $B_5$ has been made to point to the first item $n_9$ in the primary bucket suffix. FIG. 2I shows the state of the resize operation following blocks 18 and 20 of FIG. 1B for the current pass. Both of primary hash buckets $B_0$ and $B_2$ have been unlinked from secondary hash buckets $B_0$ and $B_5$, respectively. This completes the third pass through the primary hash table $H_{primary}$.

Figure 2J:
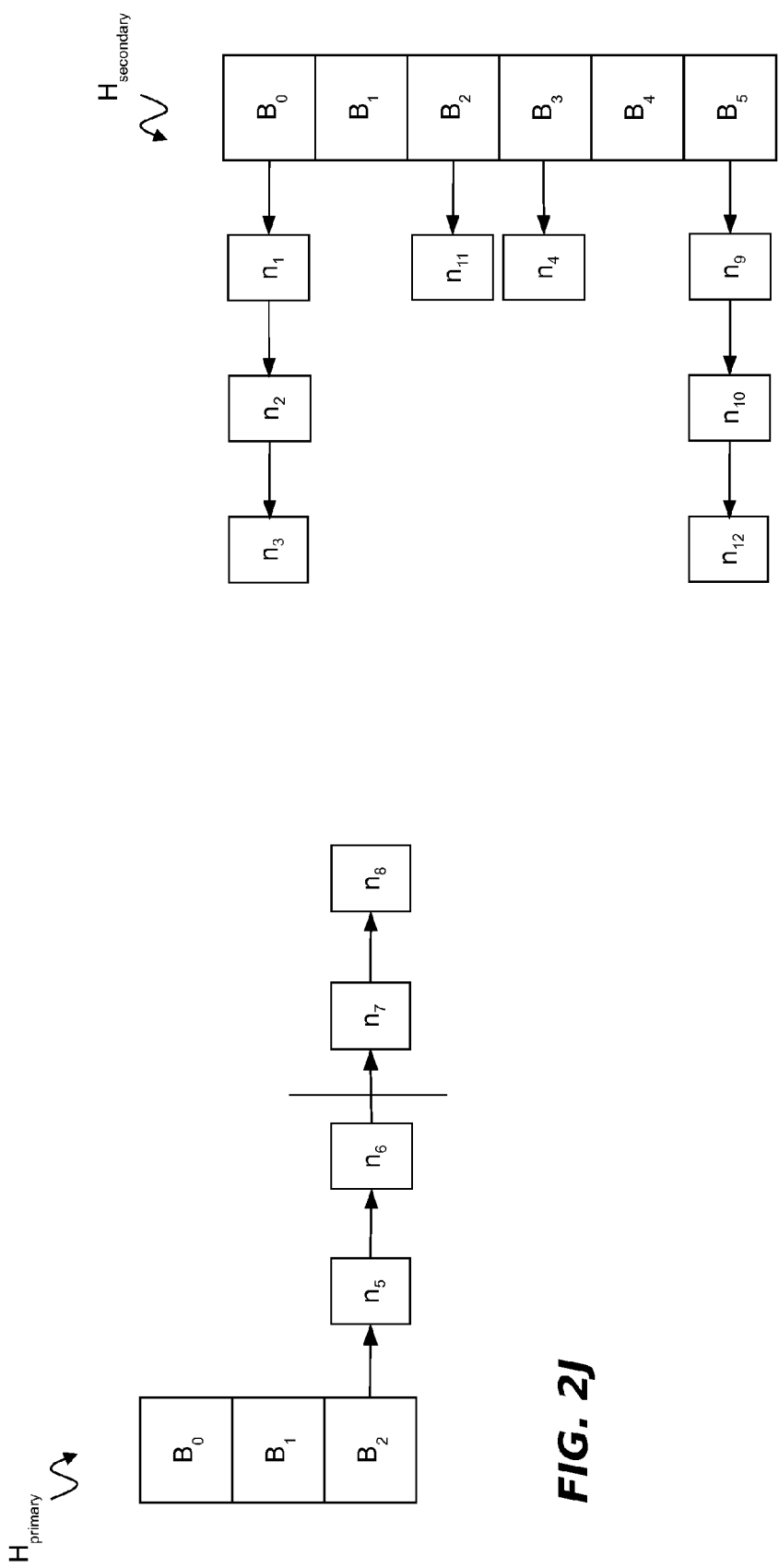
Figure 2K:
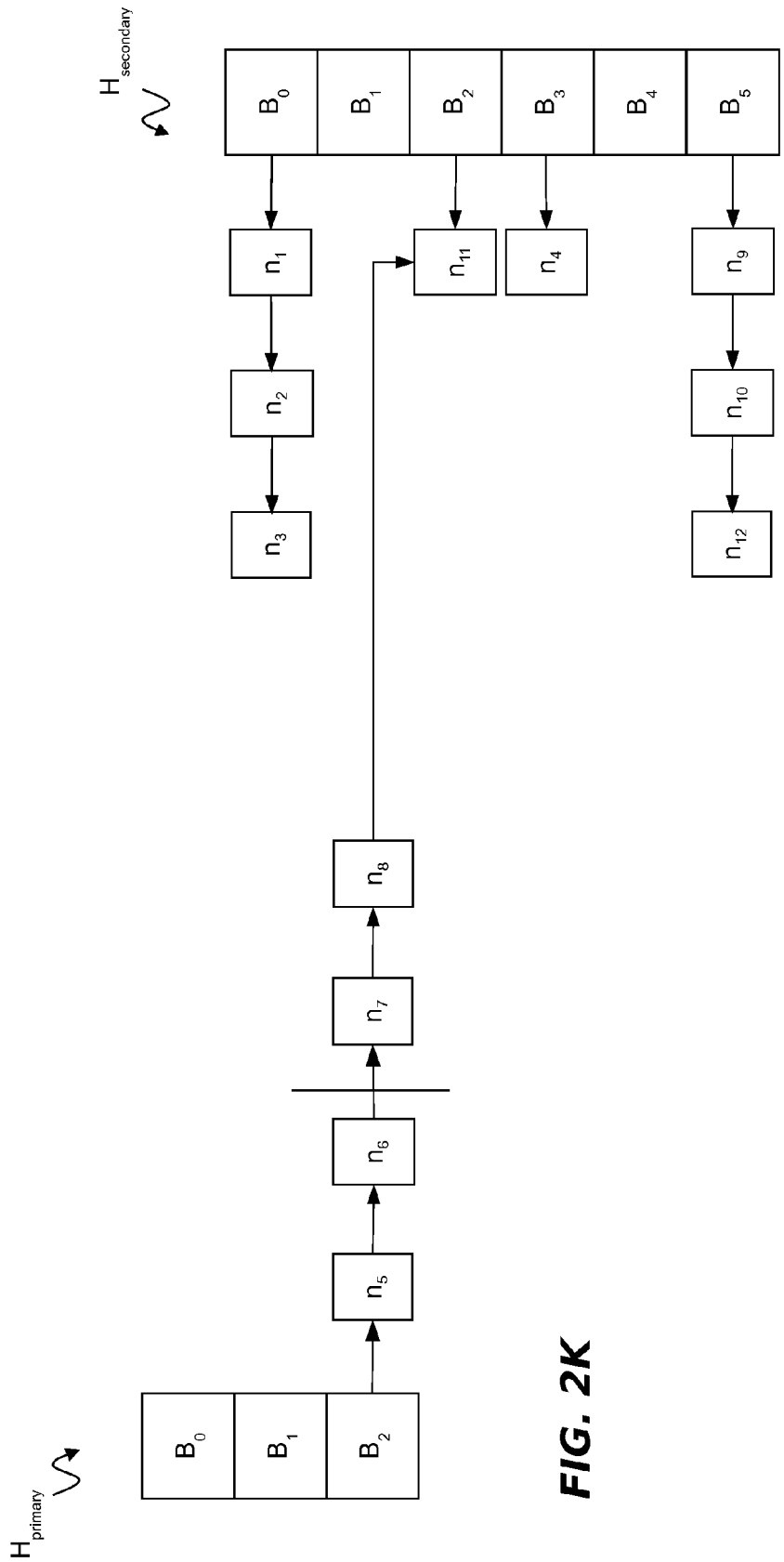
Figure 2L:
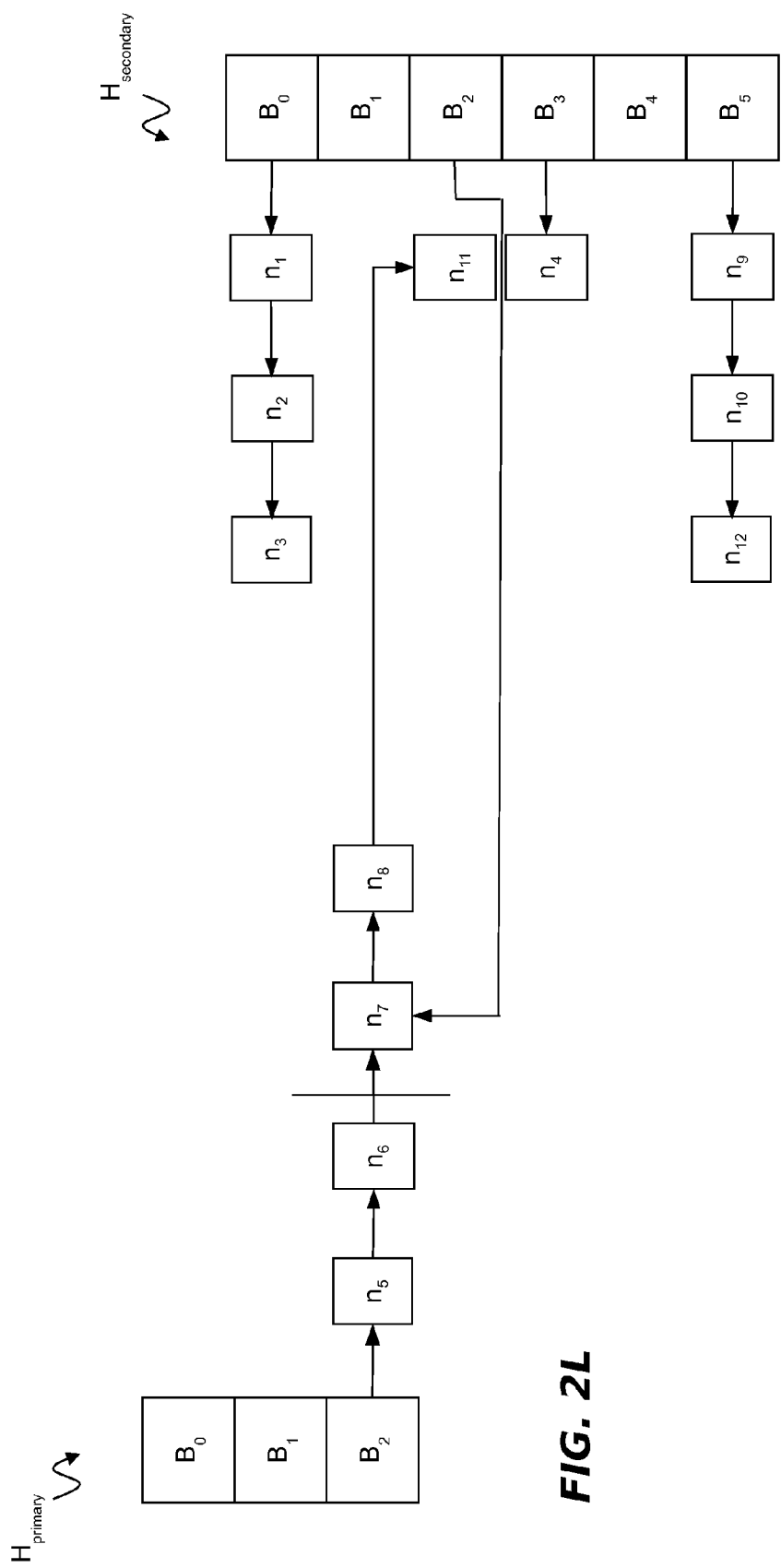
Figure 2M:
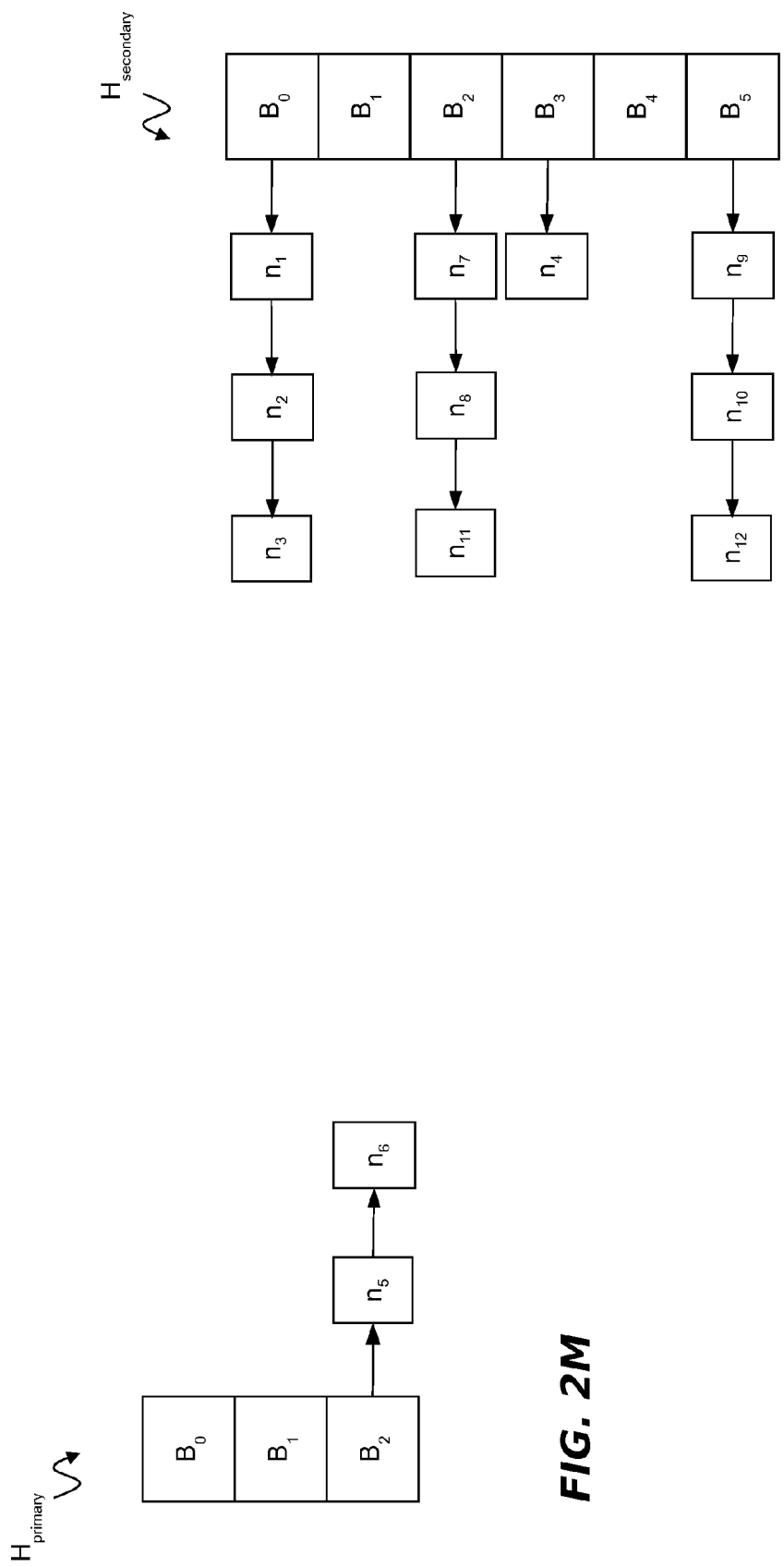

The fourth pass through the primary hash table $H_{primary}$ to identify suffixes of interest begins in FIG. 2J. In this figure, block 10 of FIG. 1A has been performed and the non-empty primary bucket $B_2$ has been determined to contain two items $n_7$ and $n_8$ that hash to secondary bucket $B_2$. These items represent a suffix starting from the end of primary bucket $B_2$ and stopping at the vertical line to the left of element $n_7$. In FIG. 2K, block 14 of FIG. 1A has been performed and item $n_8$ representing the end of primary bucket $B_2$ (and the last item in the primary bucket suffix) has been linked to the first item $n_{11}$ in secondary bucket $B_2$. In FIG. 2L, block 16 of FIG. 1A has been performed and the head of secondary bucket $B_2$ has been made to point to the first item $n_7$ in the primary bucket suffix. FIG. 2M shows the state of the resize operation following blocks 18 and 20 of FIG. 1B for the current pass. Primary hash bucket $B_2$ has been unlinked from secondary hash bucket $B_2$. This completes the fourth pass through the primary hash table $H_{primary}$.

Figure 2N:
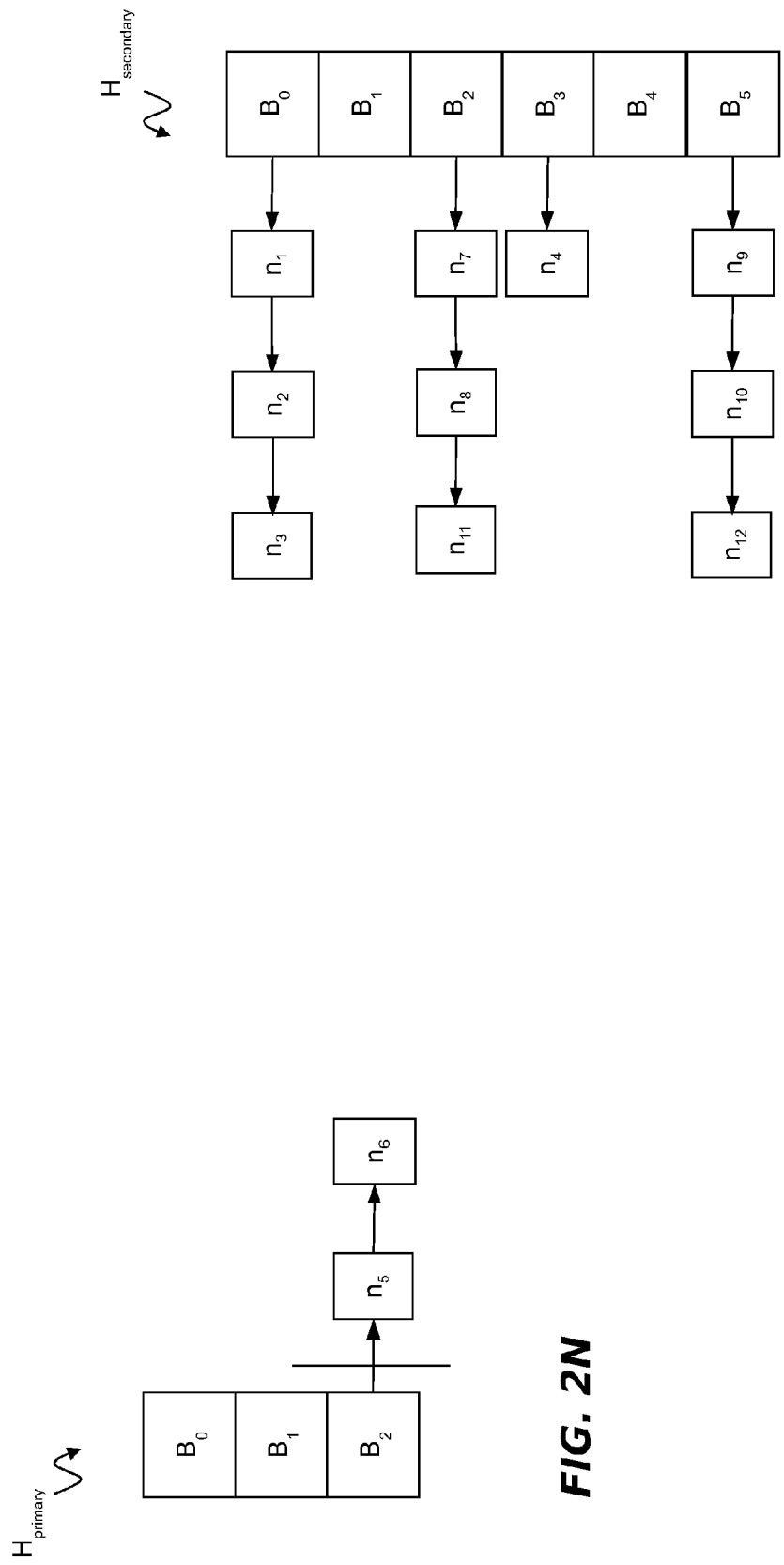
Figure 20:
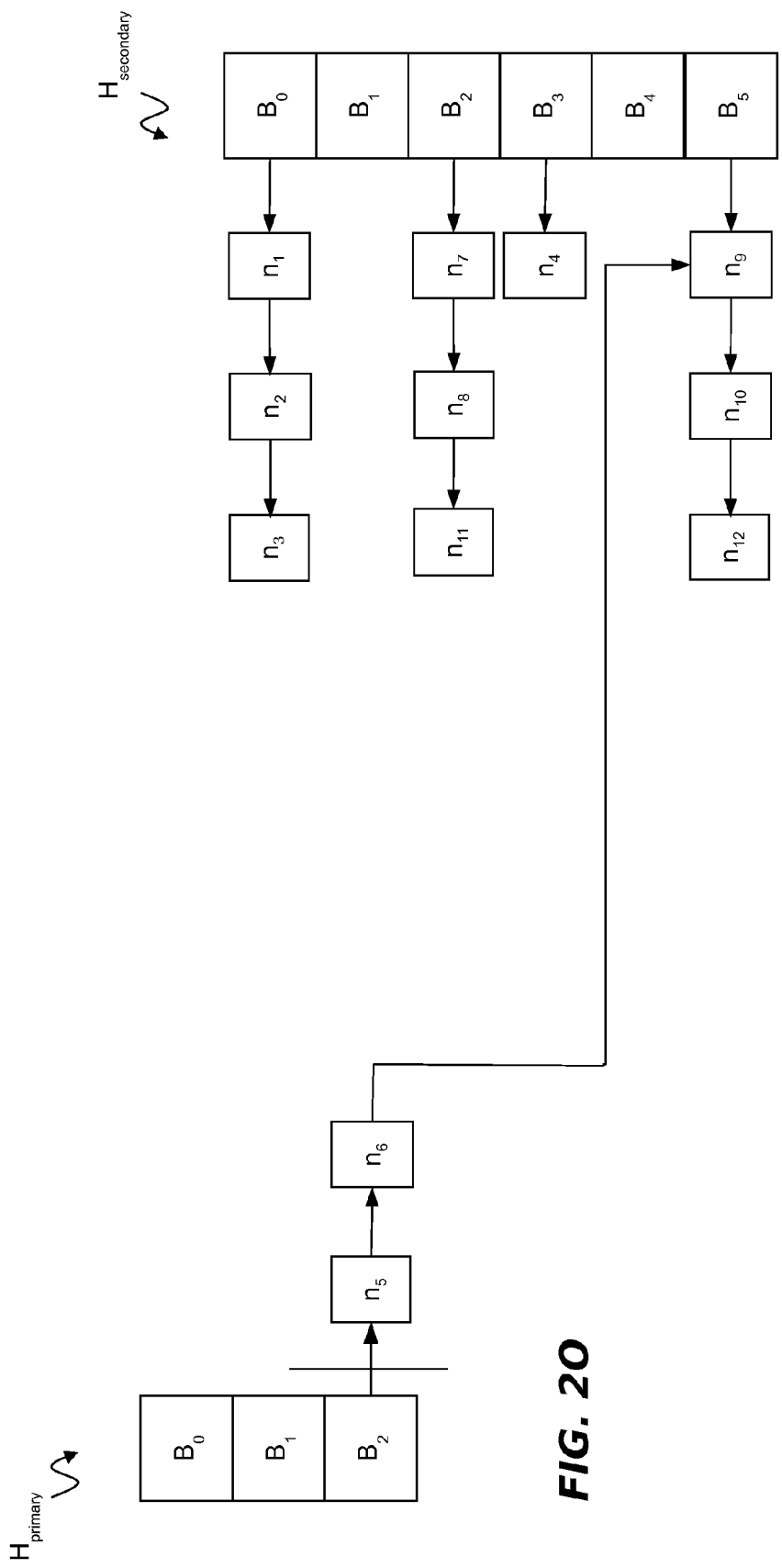
Figure 2P:
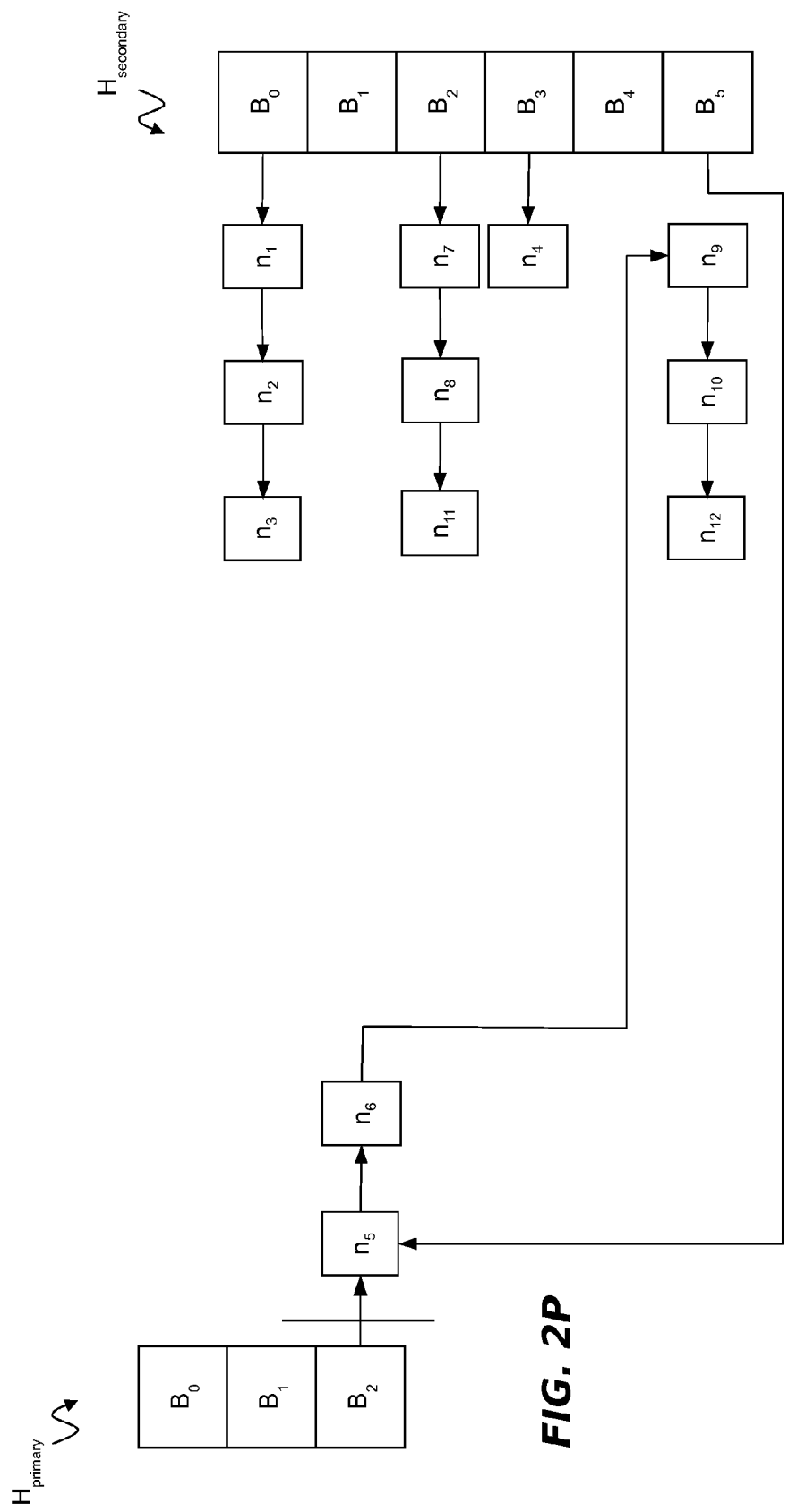
Figure 2Q:
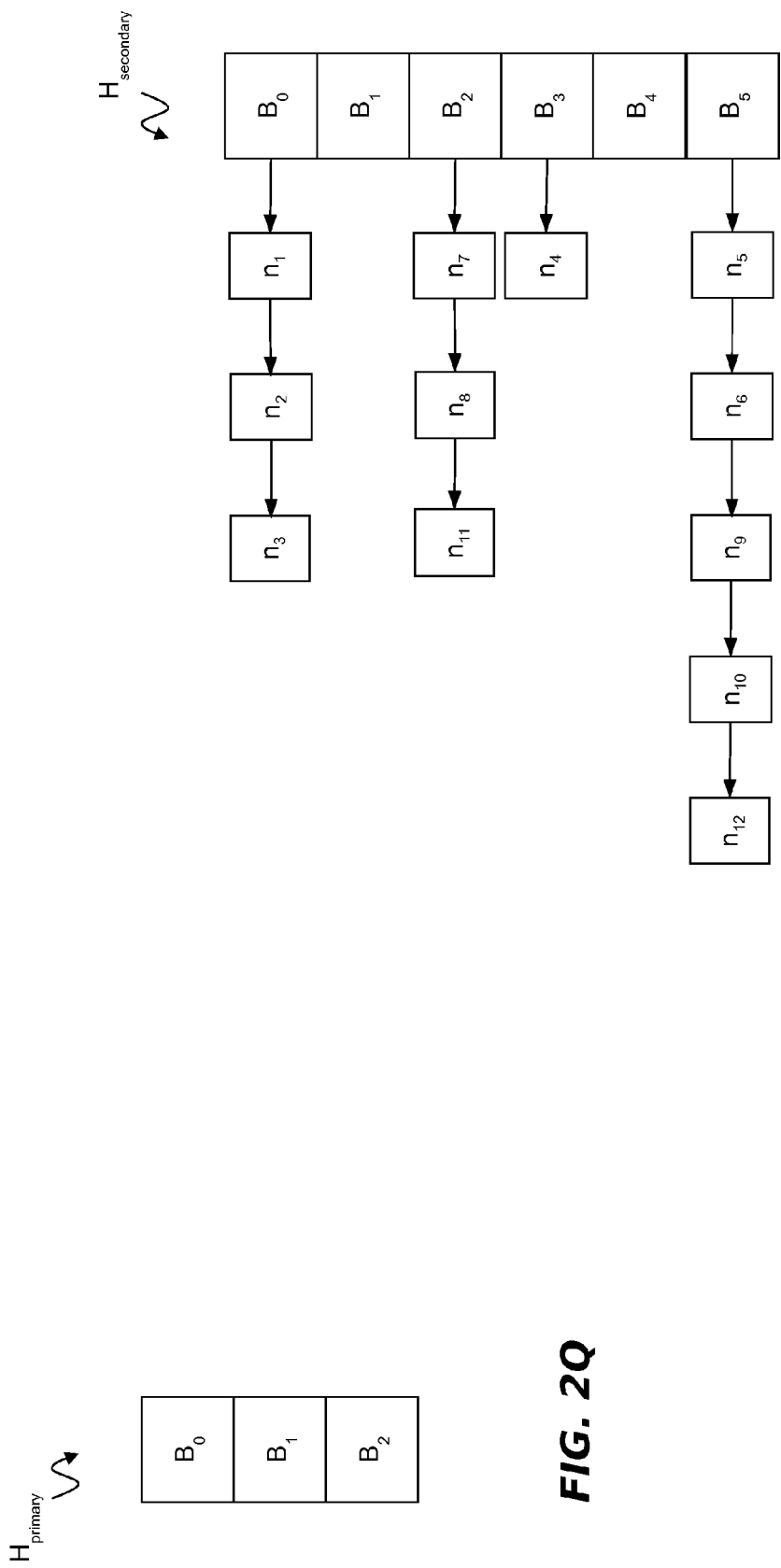
Figure 2R:
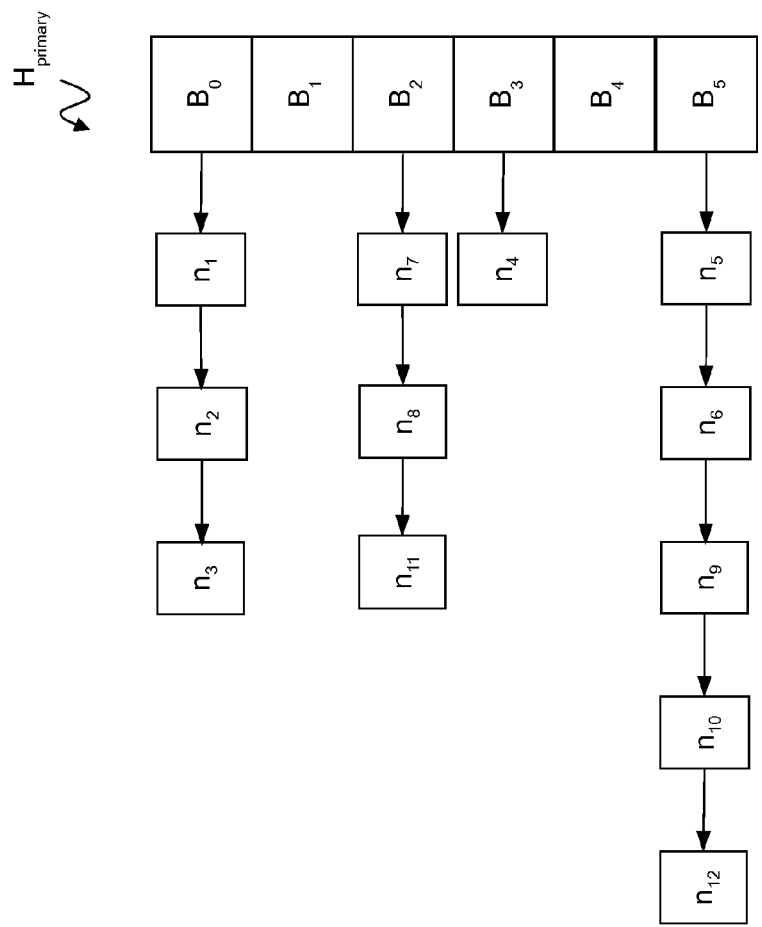

The fifth pass through the primary hash table $H_{primary}$ to identify suffixes of interest begins in FIG. 2N. In this figure, block 10 of FIG. 1A has been performed and the non-empty primary bucket $B_2$ has been determined to contain two items $n_5$ and $n_6$ that hash to secondary bucket $B_5$. These items represent a suffix starting from the end of primary bucket $B_2$ and stopping at the vertical line to the left of element $n_5$. In FIG. 2O, block 14 of FIG. 1A has been performed and item $n_6$ representing the end of primary bucket $B_2$ (and the last item in the primary bucket suffix) has been linked to the first item $n_9$ in secondary bucket $B_3$. In FIG. 2P, block 16 of FIG. 1A has been performed and the head of secondary bucket $B_5$ has been made to point to the first item $n_5$ in the primary bucket suffix. FIG. 2Q shows the state of the resize operation following blocks 18 and 20 of FIG. 1B for the current pass. Primary hash bucket $B_2$ has been unlinked from secondary hash bucket $B_6$. This completes the fifth (and final) pass through the primary hash table $H_{primary}$. FIG. 2R shows the final state of the resize operation following blocks 24, 26 and 28 of FIG. 1B. The secondary hash table $H_{secondary}$ is now the primary hash table $H_{primary}$, the resize operation has waited for all current readers of the old primary hash table to finish their searches of that table, and the old table has been freed.

Choosing Hash Functions to Optimize Resizing

Typically, a hash function used for hash tables will generate a hash value that is the size of a system word (for instance, 32 bits on a 32-bit machine, 64 bits on a 64-bit machine). The hash table algorithm will apply the hash function to an item's key to obtain the hash value, and then map the hash value to a hash bucket using an operation such as a modulus (modulo operation) based on the table size (number of buckets). This operation may be expressed as: 'hash value (mod) table size=bucket.' Table 1 illustrates this concept for a hash table containing three buckets $B_0$, $B_1$ and $B_2$ whose items have keys that hash to hash values comprising the set of integers ranging from 0-17. The modulus operation that determines the bucket placement is 'hash value (mod) 3=bucket.'

TABLE 1

| $B_0$ | 0 | 3 | 6 | 9  | 12 | 15 |
| $B_1$ | 1 | 4 | 7 | 10 | 13 | 16 |
| $B_2$ | 2 | 5 | 8 | 11 | 14 | 17 |

With such an approach, determining bucket placements for a new hash table with a larger or smaller number of buckets simply requires changing the number used in the modulus. In particular, readers need not calculate a second hash when performing a lookup in the secondary table, and the secondary table information need only store the size of the table, not a new hash function. Table 2 is illustrative. It depicts the hash table of Table 1 after it has been grown to a size that adds three additional buckets $B_3$, $B_4$ and $B_5$. The modulus operation that determines the bucket placement for the same hash values (the set of integers ranging from 0-17) is now 'hash value (mod) 6=bucket.'

TABLE 2

| | | | |
|---|---|---|---|
| $B_0$ | 0 | 6 | 12 |
| $B_1$ | 1 | 7 | 13 |
| $B_2$ | 2 | 8 | 14 |
| $B_3$ | 3 | 9 | 15 |
| $B_4$ | 4 | 10 | 16 |
| $B_5$ | 5 | 11 | 17 |

An advantage may be obtained if the resizing is restricted to occur via an integral resize factor, commonly a power of two. This factor must also divide the number of buckets in the case of reduction. Given this restriction on the resize factor, expanding a hash table will ensure that each secondary bucket contains items from only one primary bucket, and each primary bucket maps to a small number of secondary buckets (as many as the resize factor). This eliminates the issue of secondary bucket collisions, reducing the number of item-moving passes required in the resize operation (and thus the number of waits for readers to finish) to at most the maximum length of any hash chain, which will ideally remain small. Table 2 illustrates this concept using a resize factor of two. FIGS. 2A-2R also use a resize factor of two. In both examples, each primary bucket maps to at most two secondary buckets (i.e., primary bucket $B_0$ maps to secondary buckets $B_0$ and $B_3$, primary bucket $B_1$ maps to secondary buckets $B_1$ and $B_4$ and primary bucket $B_2$ maps to secondary buckets $B_2$ and $B_5$).

This restriction on the resize factor also ensures that when shrinking the table, each primary bucket will map to exactly one secondary bucket, and each secondary bucket will contain items from a small number of primary buckets (again, as many as the resize factor). This groups the item-moving passes to occur using as many adjacent primary buckets as the number of secondary buckets, and restricts the number of passes to at most the resize factor.

It should be pointed out that non-modulo bucket placement techniques may also be used that will achieve the foregoing advantages of using an integral resize factor. For example, a right-shift operation or an operation that selects some number of low-order bits will work if the resize factor is a power of two. Integer division is another operation that may be used. As described in more detail below in connection with sorted buckets, there are special cases where certain bucket placement techniques (such as a modulus or selecting low-order bits) may not be used.

Resizing in Place without Using Secondary Hash Table

Given the approach to hashing described above, it is possible to resize a hash table in place, assuming the available memory allocation method allows the memory allocation for the hash table to grow or shrink without moving it. For this operation, instead of a secondary table, it is only necessary to keep a secondary table size. When searching the hash table while it is being resized, readers may use the two sizes as moduli to find the two possible buckets (the primary and secondary buckets, respectively) containing an item. Readers would first search using the primary modulus (the one associated with the initial table size) to look for the item in the primary bucket. If the item is not found (or if multiple items are being searched using a given key) a reader will try the secondary modulus (the one associated with the secondary table size) to look for the item(s) in the secondary bucket.

In-Place Hash Table Size Increase

Figure 3A:
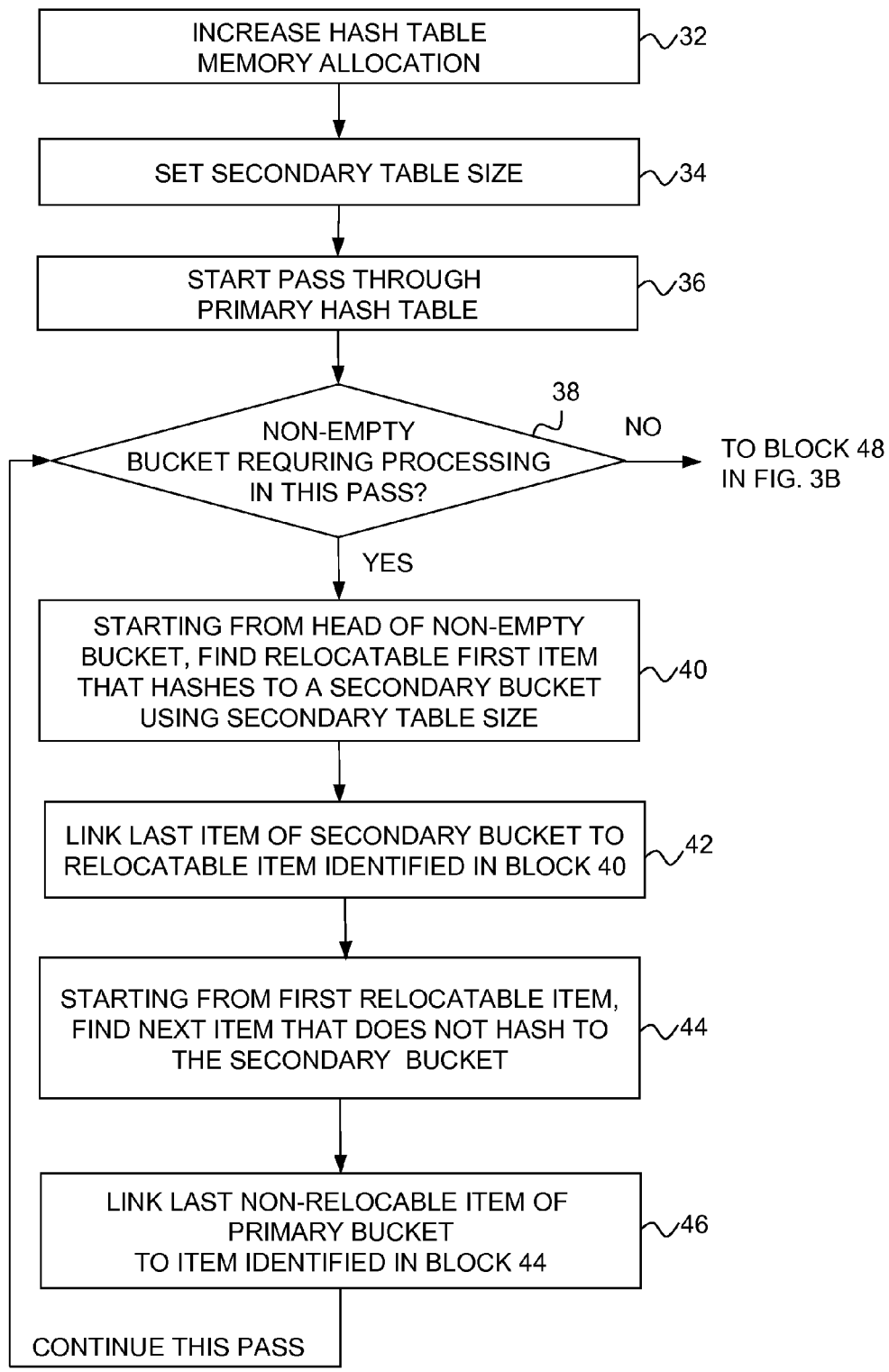
FIGS. 3A-3B represent a flow diagram a second example embodiment for resizing a hash table.
Figure 3B:
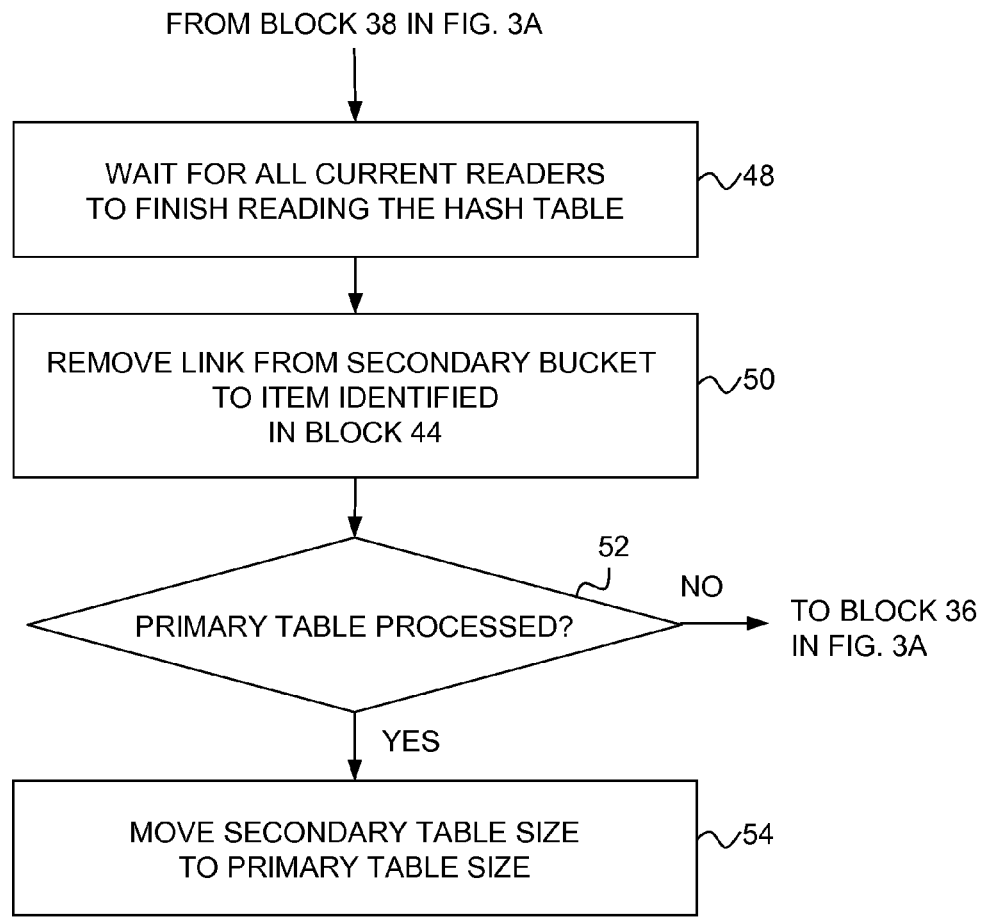

When growing a hash table in place, the original buckets are designated the primary buckets and the buckets being added are designated the secondary buckets. All items in the hash table will either remain in their primary bucket or move to a secondary bucket. Each of the secondary buckets resulting from the resizing operation will receive items from exactly one primary bucket. FIGS. 3A-3B illustrate example operations that may be used to grow a hash table in place. In block 32, the resize operation increases the hash table's memory allocation to the desired size. In block 34, the resize operation sets the new table size so that readers may use the new size (in addition to the original size) when searching. At this point, the hash table will comprise all of its primary buckets plus some number of newly added secondary buckets. In block 36, a new pass is started through the hash table. Block 38 determines if there is a non-empty primary bucket that requires processing for this pass. Starting from the head of the non-empty primary bucket, block 40 finds the first item that hashes to a secondary bucket using the new table size. Block 42 links the last item in this secondary bucket (or the secondary bucket's head pointer if the bucket is empty) to the first relocatable item identified in block 40. This cross-links the item to the primary and secondary buckets, and allows readers to find the item via the secondary bucket. Starting from the first relocatable item identified in block 40, block 44 finds the next item that does not hash to the secondary bucket identified in block 40. Block 46 then establishes a by-pass link from the last non-relocatable item that only appears in the primary bucket to the item identified in block 44 (thereby by-passing the intervening relocatable item(s)). This makes the intervening item(s), which should relocate to the secondary bucket, only appear in the secondary bucket. Processing then returns to block 38 to continue this pass through the hash table to check additional primary buckets requiring processing.

When there are no more primary buckets left to process in this pass, each primary bucket that is cross-linked to a secondary bucket will have two links to the item identified in block 44, namely, an existing link from the last relocatable item that is now now part of a secondary bucket, and the by-pass link established in block 46. Block 48 in FIG. 3B waits for all current readers (if any) who may have begun searching the hash table prior to the start of resizing to finish searching. Then, for each cross-linked item identified in block 44, block 50 removes the link from the secondary bucket so that the item is now only part of a primary bucket. The wait operation of block 48 protects readers who began their search on a primary bucket and reached the first relocatable item identified in block 40 before the bypass link of block 46 was established. These readers need to be able to continue their search through the relocatable item(s) (which are now on a secondary bucket) to reach the item identified in block 44 before the link from the secondary bucket is removed. Block 48 may be implemented using an RCU grace period or the like, as described above in connection with block 18 of FIG. 1B. All new readers who begin their searches after the start of resizing will thereafter see the relocated items via the secondary bucket(s), so they need not also see them via the primary bucket(s). Block 52 determines if another pass is required and if so the processing state returns to block 36. When no further passes are required, block 52 moves the secondary table size to the primary table size.

In-Place Hash Table Size Increase Example

The operations of FIGS. 3A-3B may be further understood by way of an example of increasing the size of a hash table in place. With reference now to FIGS. 4A-4G, FIG. 4A depicts the initial state of a hash table $H_{primary}$ whose size is to be increased. For ease of illustration, the hash table $H_{primary}$ is shown as having three hash buckets $B_0$, $B_1$ and $B_2$. Buckets $B_0$ and $B_1$ are assumed to be empty. Bucket $B_2$ contains six items implemented as list nodes $n_1$, $n_2$, $n_3$, $n_4$, $n_9$, $n_6$, $n_7$ and $n_8$.

Figure 4A:
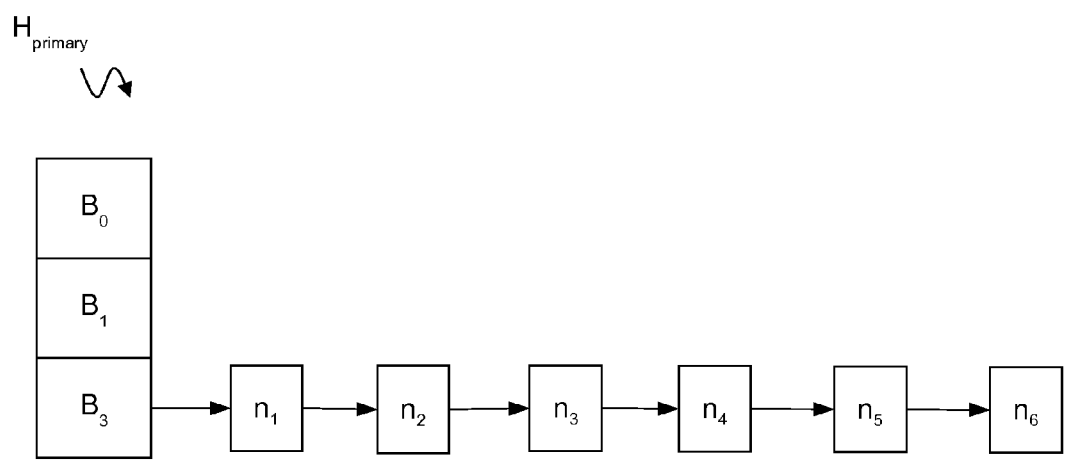
FIGS. 4A-4G are diagrammatic representations showing individual steps of the hash table resizing embodiment of FIGS. 3A-3B.
Figure 4B:
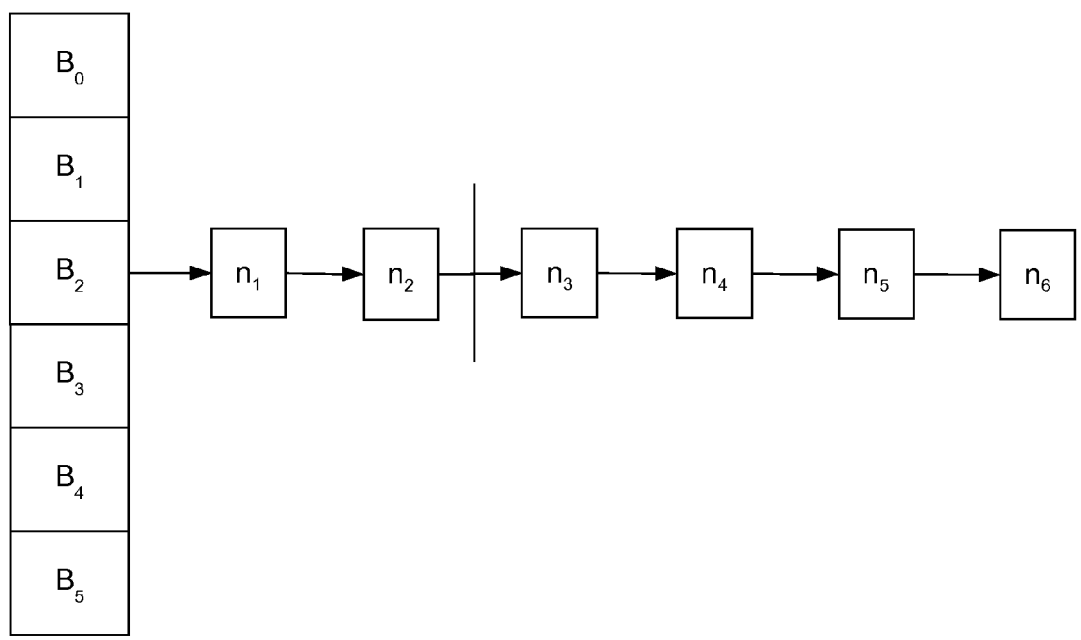
Figure 4C:
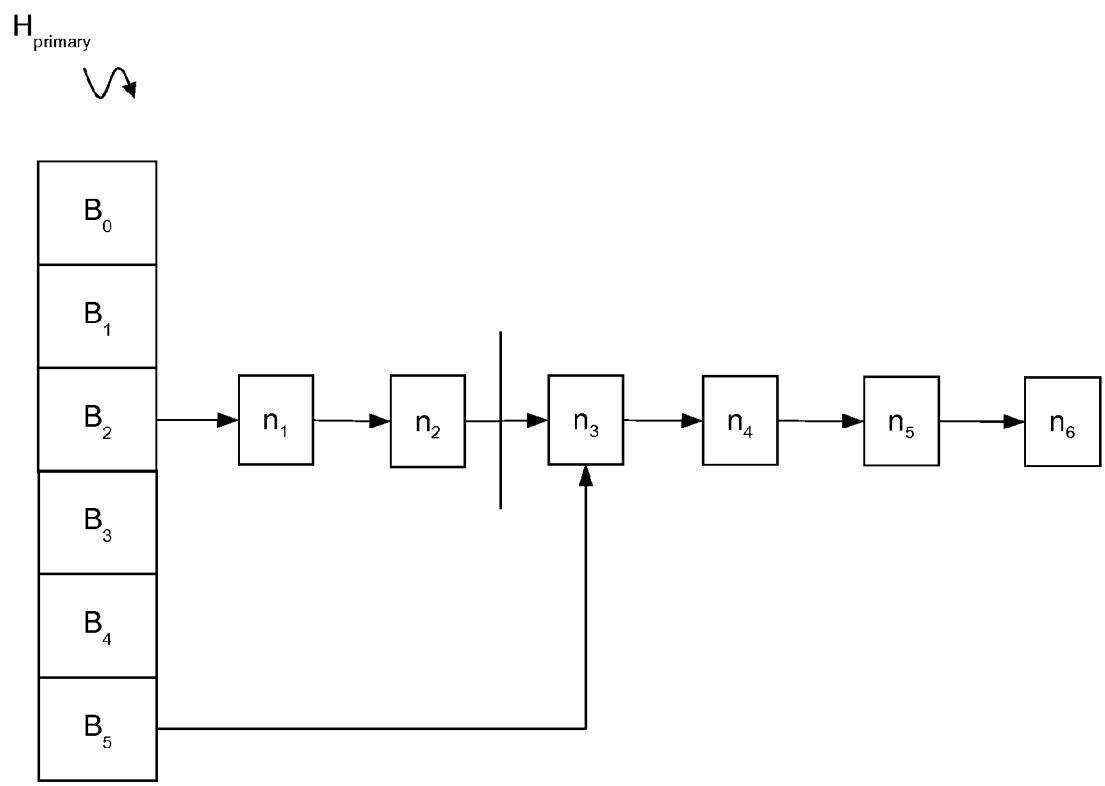
Figure 4D:
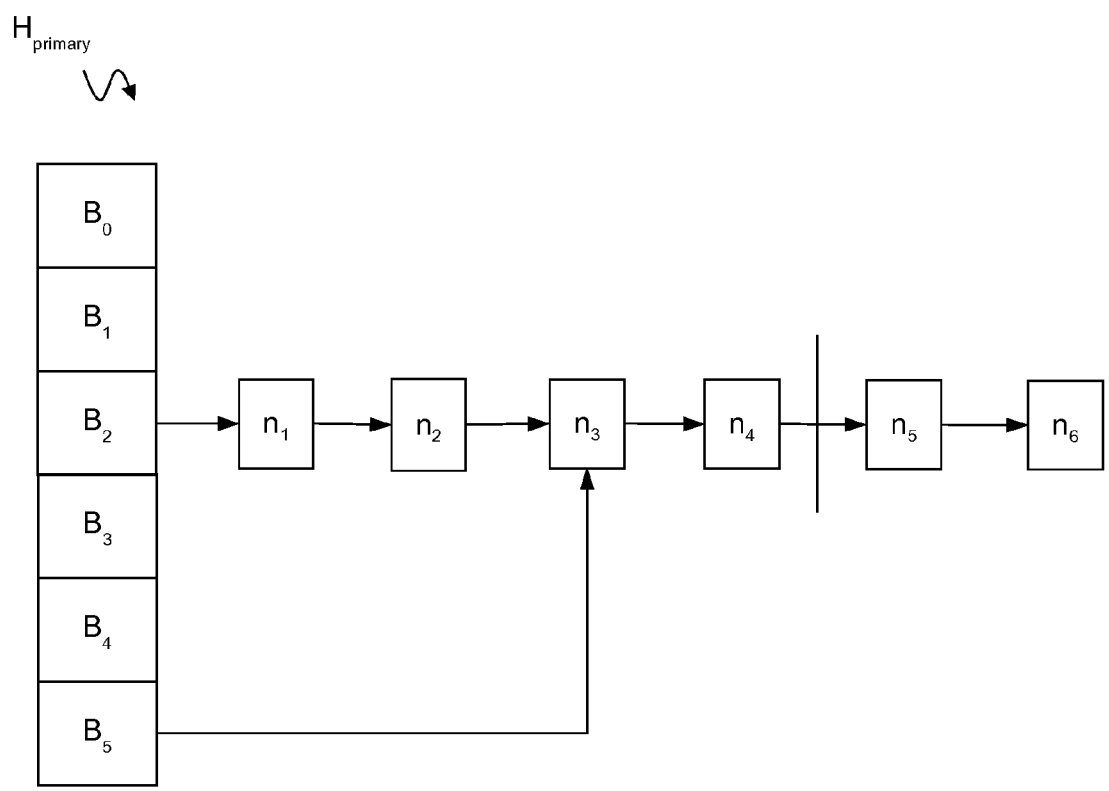
Figure 4E:
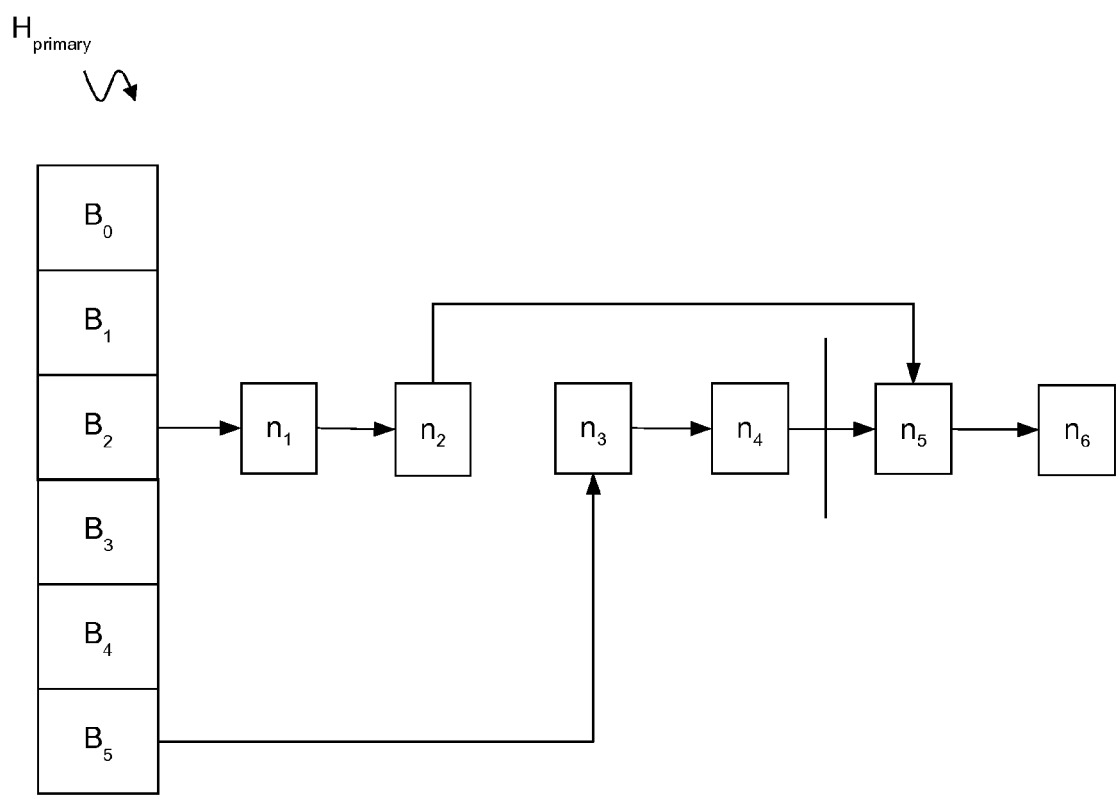

In FIG. 4B, blocks 32-40 have been implemented so that the hash table memory allocation has been doubled to add secondary buckets $B_3$, $B_4$ and $B_5$, the secondary table size has been set, a first pass has been started through the hash table, the primary bucket $B_2$ has been identified as requiring processing, and item $n_3$ has been identified as a first relocatable item that hashes to bucket $B_5$. In FIG. 4C, block 42 of FIG. 3A has been performed and the head pointer of bucket $B_5$ has been made to point to item $n_3$. In FIG. 4D, block 44 of FIG. 3A has been performed and a next item $n_5$ that does not hash to secondary bucket $B_5$ has been identified. In FIG. 4E, block 46 of FIG. 3A has been performed so that the last non-relocatable item $n_2$ of primary bucket $B_2$ has been linked to item $n_5$ identified in block 44.

Figure 4F:
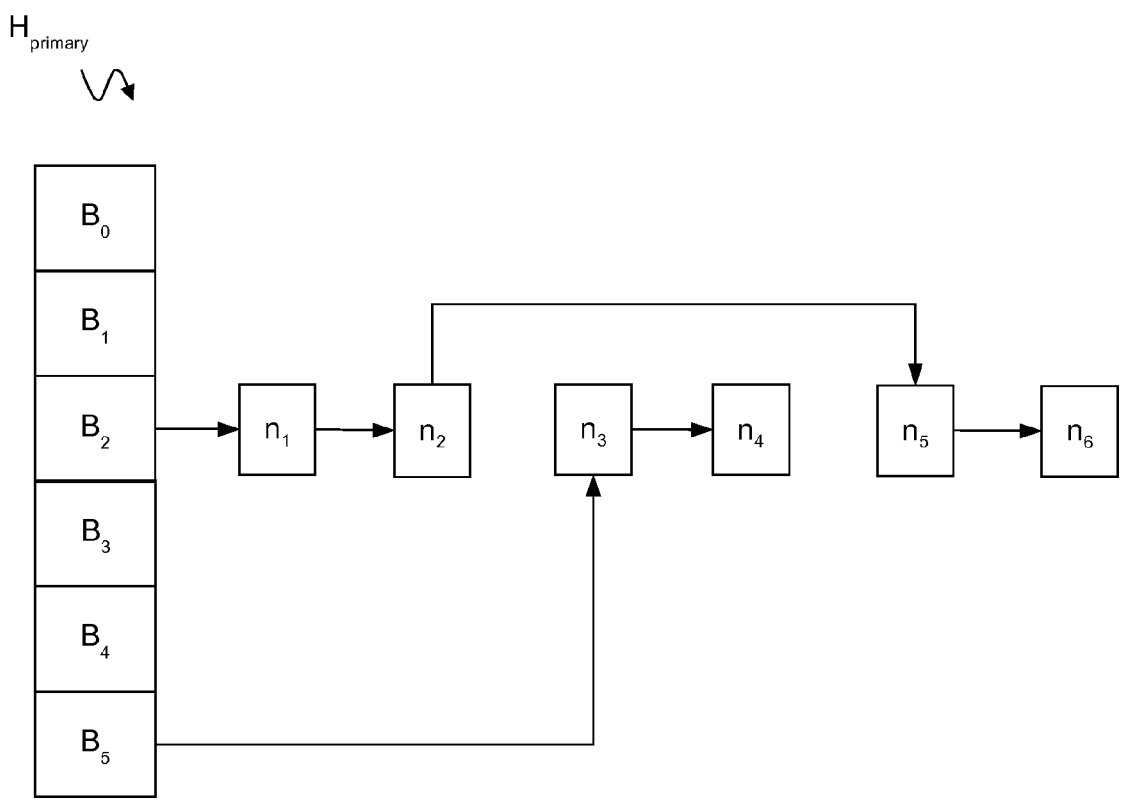
Figure 4G:
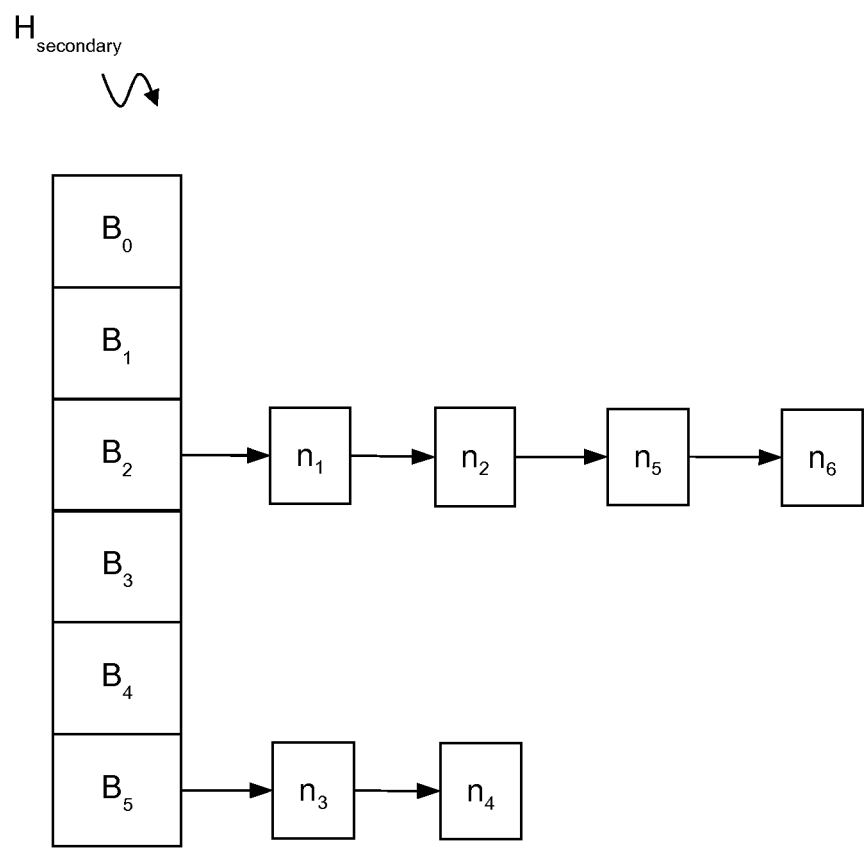

Because this example requires no further bucket processing for this pass, processing proceeds to blocks 48 and 50 of FIG. 3B. FIG. 4F shows the hash table state following block 50 in which the link between items $n_4$ and $n_5$ has been removed. For this example, no further passes are required. FIG. 4G shows the final hash table state following block 54 in which the secondary hash table size has been applied and the resized hash table becomes $H_{secondary}$.

In-Place Hash Table Size Decrease

Figure 5:
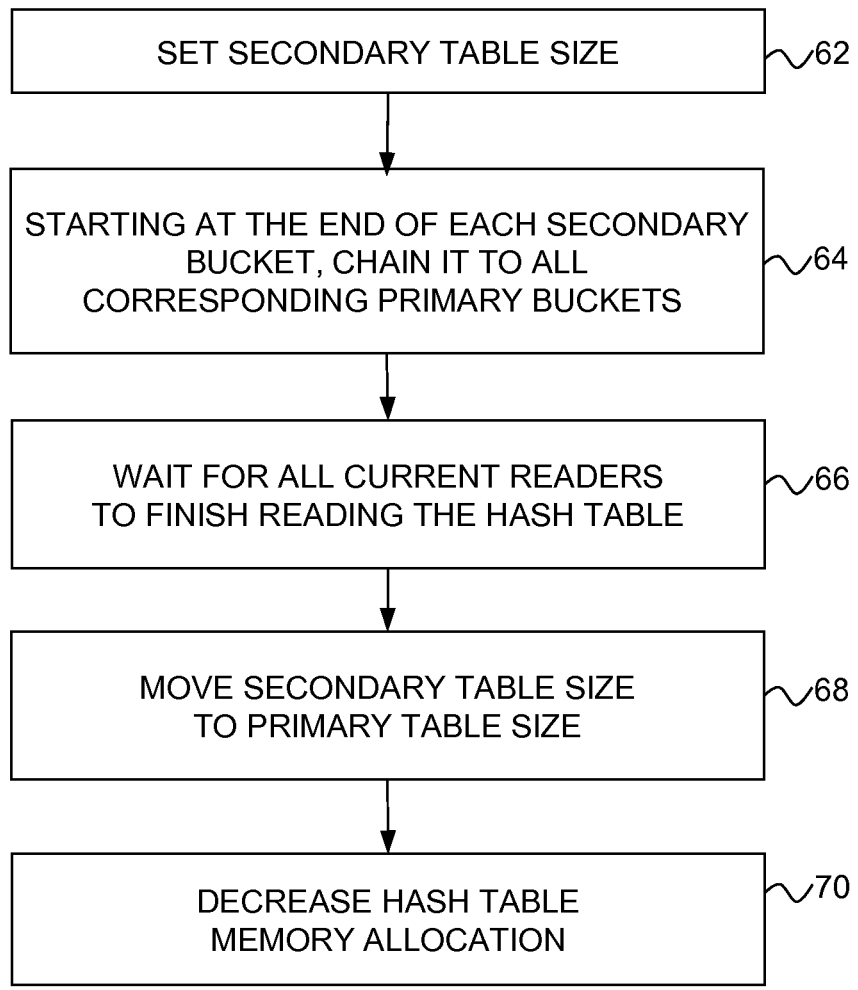
FIG. 5 is a flow diagram showing a third example embodiment for resizing a hash table.

When shrinking a hash table in place, the size of the hash table will be divided by the resize factor. The original buckets being eliminated are designated the primary buckets and the original buckets that remain after resizing are designated the secondary buckets. All items in the hash table will either remain in their primary bucket or move to a secondary bucket. Each of the secondary buckets resulting from the resizing operation will receive items from some number of primary buckets that is equal to the resize factor. FIG. 5 illustrates example operations that may be used to shrink a hash table in place. In block 62, the resize operation sets the reduced secondary table size so that readers may use the new size (in addition to the original size) when searching. In block 64, the end of each secondary bucket is linked to the beginning of the next corresponding primary bucket. The end of each such primary bucket is then linked to the next corresponding primary bucket, and so on for each additional primary bucket that will also become part of a single corresponding secondary bucket. This will create a chain that extends through as many primary buckets as the resize factor, with the primary bucket(s) being cross-linked to the secondary bucket. In block 66, the resize operation waits for all current readers (if any) who may have begun searching the hash table prior to the start of resizing to finish searching. This may be implemented using an RCU grace period or the like, as described above in connection with block 18 of FIG. 1B. All new readers who begin their searches after the start of resizing will thereafter see the cross-linked buckets. Block 68 moves the secondary table size to the primary table size, which effectively ends the cross-linking because the primary buckets will no longer be searched. Block 70 shrinks the hash table's memory allocation.

In-Place Hash Table Size Decrease Example

Figure 6A:
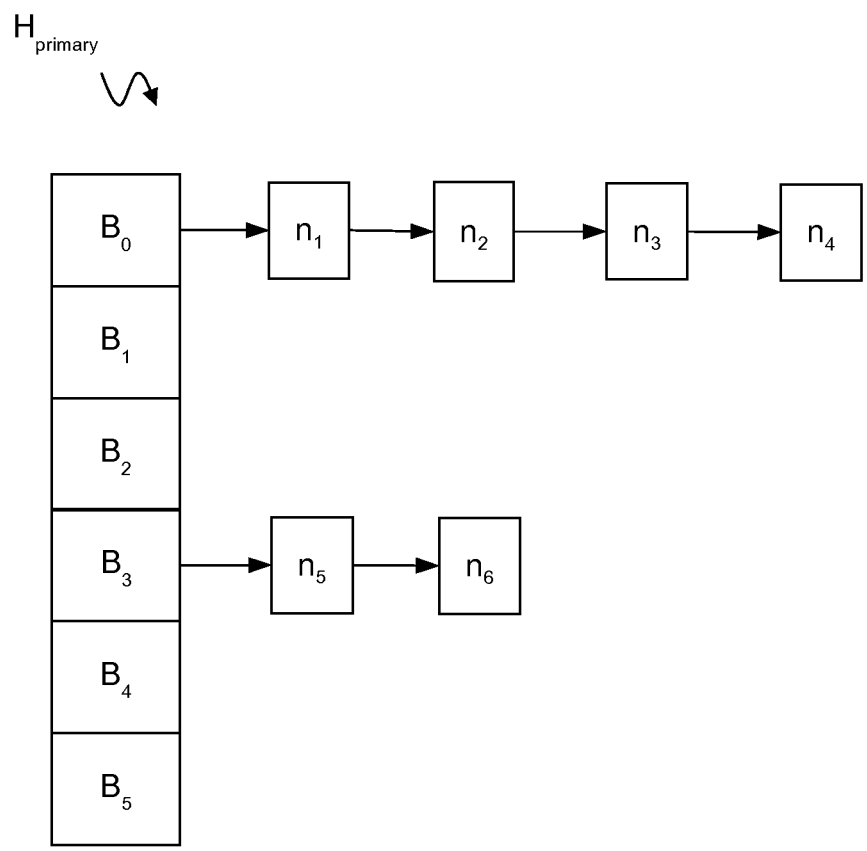
FIGS. 6A-6C are diagrammatic representations showing individual steps of the hash table resizing embodiment of FIG. 5.
Figure 6B:
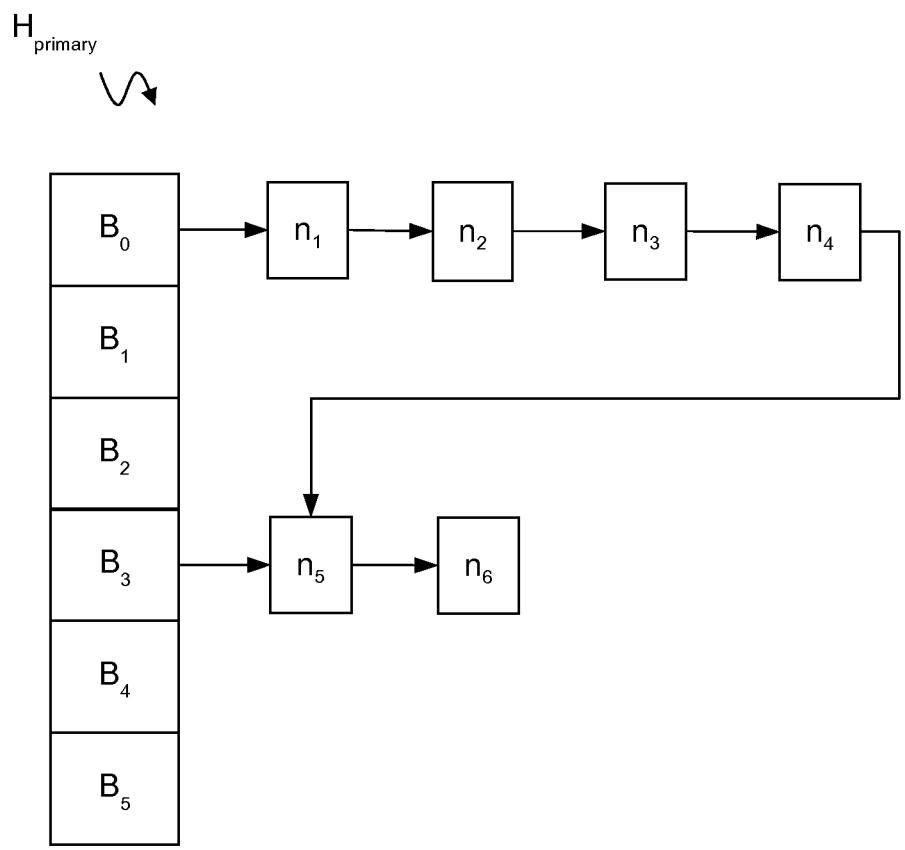
Figure 6C:
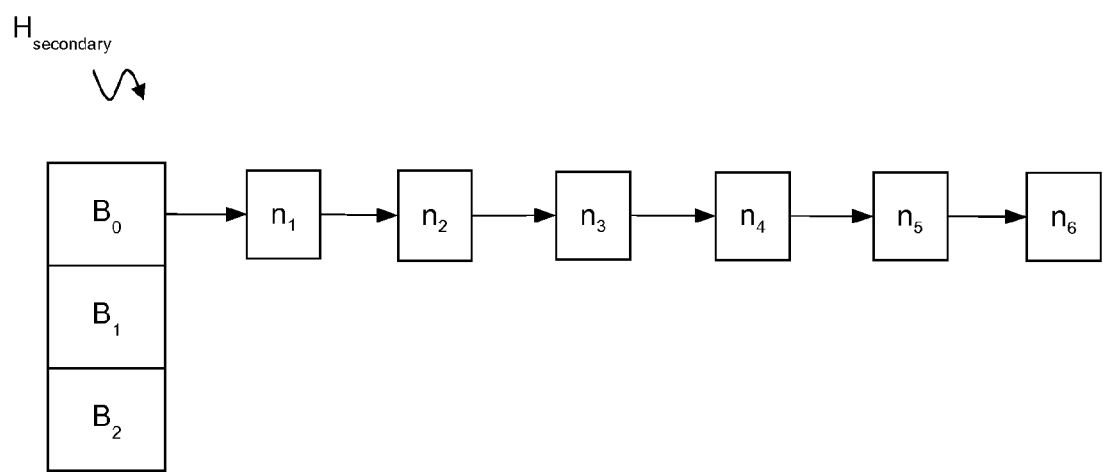

The operations of FIG. 5 may be further understood by way of an example of decreasing the size of a hash table in place. With reference now to FIGS. 6A-6C, FIG. 6A depicts the initial state of a hash table $H_{primary}$ whose size is to be decreased. For ease of illustration, the hash table $H_{primary}$ is shown as having six hash buckets $B_0$, $B_1$, $B_2$, $B_3$, $B_4$ and $B_5$. Buckets $B_1$, $B_2$, $B_4$ and $B_5$ are assumed to be empty. Bucket $B_0$ contains four items implemented as list nodes $n_1$, $n_2$, $n_3$ and $n_4$. Bucket $B_3$ contains two items implemented as list nodes $n_5$ and $n_6$. In FIG. 6B, blocks 62 and 64 of FIG. 5 have been implemented by setting the secondary table size (three buckets) and chaining the end of bucket $B_0$ (item $n_5$) to the beginning of bucket $B_3$ (item $n_5$). FIG. 6C shows the completion of the resizing operation following blocks 66, 68 and 70. The hash table is now designated $H_{secondary}$, and has a size of three buckets instead of the original six buckets.

Keeping Buckets Sorted

Typically, a hash table implementation will not enforce any ordering on the items within a hash bucket. This allows insertions to take constant time even if a bucket contains many items. However, if the items in a bucket are kept sorted by the hash key, and if the hash function preserves the order of the keys, all items destined for a given secondary bucket will be grouped together in the primary bucket. This should allow a resize operation that increases the size of a hash table to make only a single pass through the hash table, establishing cross-links for each primary bucket sequence to be relocated to a corresponding secondary bucket, and then performing a single "wait for current readers" operation followed by removing all cross links. This approach optimizes resize operations significantly, at the expense of slowing down insertions into large buckets. Furthermore, an application may find sorted buckets useful for other reasons, such as optimizing lookups. As indicated, preserving the order of items during resizing imposes a constraint on the hash function and bucket placement technique. For example, using a right-shift operation on the hash value would preserve its upper bits and thus the sorting order. Integer division would also satisfy this requirement. In contrast, using a modulus or selecting low-order bits would not work for the sorting case.

Resizing Hash Table to Same Size

A hash table implementation might choose to resize a hash table based on one or more of the following criteria:

1. Load factor, defined as the ratio of the number of items in the table to the number of buckets making up the table, and thus equal to the average bucket length. Resizing to maintain a minimal load factor favors throughput-oriented workloads.
2. The length of the longest bucket in the table, which determines the worst-case access time for an item in the table. Resizing to maintain a minimal length of the longest chain favors latency-oriented workloads.

It is possible for the loading factor to be quite low, but the length of the longest bucket to be quite high. This situation indicates a poor choice of hash function, which can be addressed by "resizing" the hash table to the same size, but switching to a different hash function. This different hash function might be a completely different computation, or it might be a perturbation of the existing hash function. The hash table resizing example of FIGS. 1A-1B may be used to resize a hash table to the same size with a new hash function.

Example Computing Environment

Figure 7:
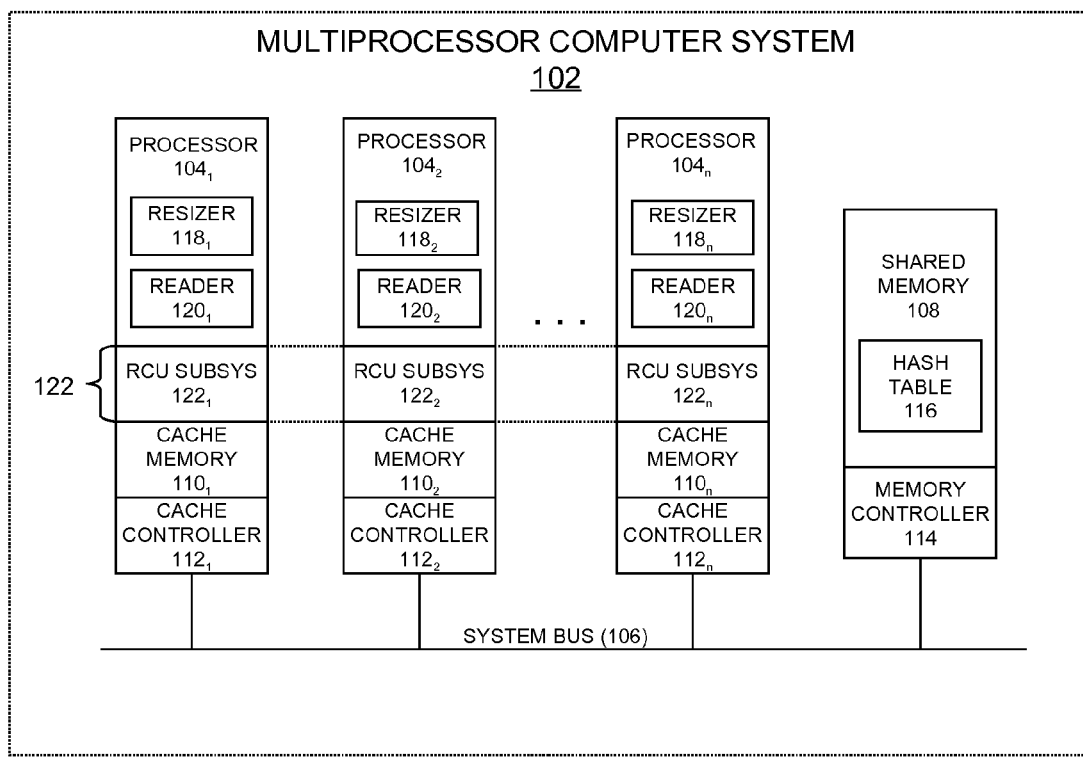
FIG. 7 is a functional block diagram showing a multiprocessor computing system that represents one example environment for supporting hash table resizing.

Turning now to FIG. 7, an example computing environment is illustrated in which hash table resizing may be implemented. In particular, a symmetrical multiprocessor (SMP) computing system 102 is shown in which multiple processors $104_1$, $104_2$ ... $104_n$ are connected by way of a common system bus 106 (or other communication pathway) to a shared memory 108. As used herein, a "processor" refers to a singlethreaded or multi-threaded CPU (Central Processing Unit) core within a single-core or multi-core processing device (with each core being considered a CPU) that executes program instruction logic, such as software or firmware. The memory 8 may comprise any type of tangible storage medium capable of storing data in computer-readable form. The processors 4 and the memory 8 may be situated within a single computing node (e.g., as part of a single-node SMP system) or they may be distributed over plural nodes (e.g., as part of a NUMA system or cluster).

Respectively associated with each processor $104_1$, $104_2 \ldots 104_n$ is a conventional cache memory $110_1, 110_2 \ldots 110_n$ and a cache controller $112_1, 112_2 \ldots 112_n$. A conventional memory controller 114 is associated with the shared memory 108. The memory controller 114 may be integrated with the processors 104 or could be provided separately therefrom (e.g. as part of a chipset). The computing system 102 is assumed to be under the management of a single multitasking operating system adapted for use in a multi-processor environment. If desired, a uniprocessor system (not shown) could be used in lieu of the multiprocessor system 102.

It is further assumed that resize operations executed within processes, threads, or other execution contexts may (infrequently) perform hash table resizing on a scalable, concurrent hash table 116 stored in the shared memory 108. The hash table 116 is assumed to implement open or closed chaining, such that each bucket comprises a linked list as shown in previous examples. Reference numerals $118_1, 118_2 \ldots 118_n$ illustrate individual resize operations (resizers) that may periodically execute on the several processors $104_1, 104_2 \ldots 104_n$.

The processors $104_1, 104_2 \ldots 104_n$ also respectively execute readers $120_1, 120_2 \ldots 120_n$ that perform search operations on the hash table 116. Each search operation is assumed to entail an element-by-element traversal of a bucket (implemented as a linked list) until one or more items representing the target of the search are found. In order to support scalable concurrent hash table operations, such search operations may be performed using a lock-free synchronization mechanism, such as read-copy update.

Figure 8:
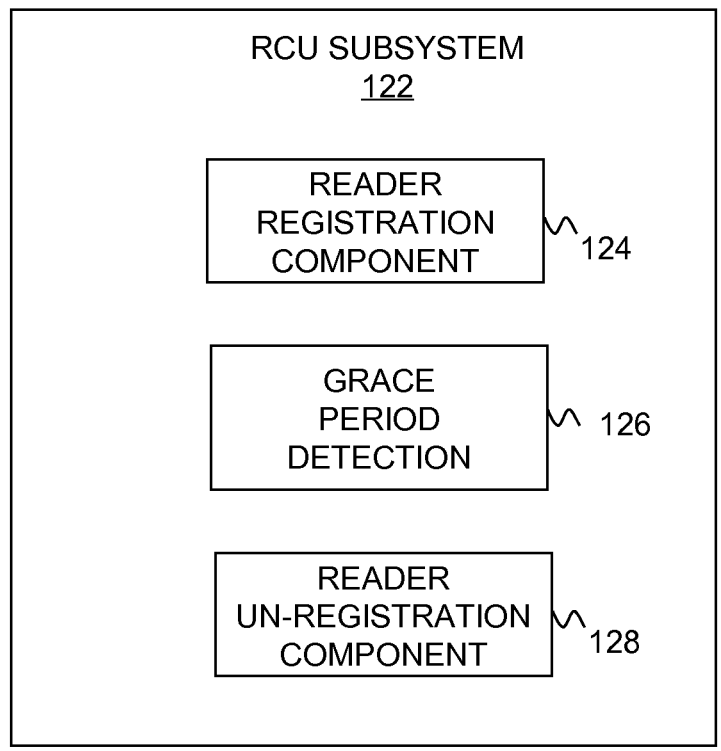
FIG. 8 is a functional block diagram showing a read-copy update subsystem that may be implemented in the multiprocessor computer system of FIG. 8.

A read-copy update (RCU) subsystem 122 may be implemented on the processors $104_1, 104_2 \ldots 104_n$ as by periodically executing respective read-copy update instances $122_1, 122_2 \ldots 122_n$. As shown in FIG. 8, each of the read-copy update subsystem instances 122, if present, may include a reader registration component 124, a grace period detection component 126 and a reader un-registration component 128.

The reader registration component 124 may be used by the readers 120 when they enter an RCU-protected critical section, such as the start of a search of the hash table 116. This component may be implemented using an RCU primitive such as rcu_read_lock( ). The reader un-registration component 128 may be used by the readers 120 when they leave an RCU-protected critical section, such as at the end of a search of the hash table 116. This component may be implemented using an RCU primitive such as rcu_read_unlock( ).

The grace period detection component 126 may also be implemented using conventional RCU processing techniques. For example, it may use information provided by the reader registration component 124 and the reader un-registration component 128 (such as a counter increment followed by a counter decrement) to determine when the readers 120 have passed through a quiescent state in which they are no longer in an RCU-protected critical section. As previously described, the grace period detection component 126 may also be implemented using a technique such as scheduling itself to run on each of the processors 104.

The grace period detection component 128 may also provide an API (Application Program Interface) into the read-copy update subsystem 120 that can be called by the resizers 118 to request detection of the passage of a grace period. The hash table resizing operations described in previous examples each involve a step of waiting for current (pre-existing) readers that commenced their hash table searches prior to the start of resizing to complete those searches. To facilitate such waiting, the resizers 118 may call the grace period detection component 126. In response, the grace period detection component 126 may start a new grace period and report to the requesting resizer when a previous grace period has ended. New readers 120 that invoke the reader registration and un-registration components 124 and 128 after this point would do so within the context of the new grace period. They would not affect monitoring of the pre-exiting readers 120 who invoked the reader registration and un-registration components 124 and 128 during the previous grace period. The previous grace period could be deemed to expire when the last pre-existing reader exits its critical section and invokes the reader un-registration component 128. If the reader registration and un-registration operations are performed by respectively incrementing and decrementing a counter (e.g., a global counter or a set of per-processor counters), the previous grace period could be determined to end when the counter (or set of counters) associated with that grace period drains to zero or some other initial value. As discussed above, other techniques providing equivalent semantics may also be used.

Finally, it should be noted that for some implementations of the computing system 2, the resize operations may require memory barriers to prevent the reordering of write instructions (e.g., adding or removing pointers) in a way that undermines the correctness of concurrent readers. The position and type of such barriers will depend on the CPU architecture, the compiler and their memory ordering semantics.

Accordingly, example embodiments have been disclosed that allow hash tables to be resized in a manner that preserves scalability and concurrency. It will be appreciated that the disclosed embodiments may be variously manifested in any of a data processing system, a machine implemented method, and a computer program product in which digitally encoded program instructions are stored on one or more computer-readable data storage media for use in controlling a computer or other data processing machine to perform the required functions. The program instructions may be comprise machine language code that is ready for loading and execution by the machine apparatus, or the program instructions may comprise a higher level language that can be assembled, compiled or interpreted into machine language. Example high level languages include, but are not limited to assembly, C, C++, to name but a few. When implemented on a machine comprising a CPU or other processor, the program instructions combine with the processor to provide a particular machine that operates analogously to specific logic circuits, which themselves could be used.

Figure 9:
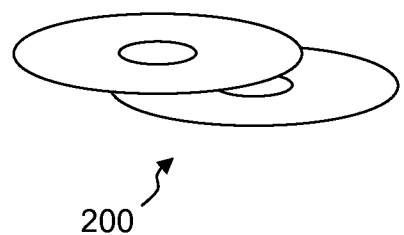
FIG. 9 is a diagrammatic illustration of example storage media that may be used to store a computer program product for implementing hash table resizing.

Example computer-readable storage media for providing such program instructions are shown by reference numeral 200 in FIG. 9. The storage media 200 are shown as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the required program instructions, either alone or in conjunction with another software product that incorporates the required functionality. The program instructions could also be provided by other portable storage media (such as floppy disks, flash memory sticks, etc.), or storage magnetic media combined with drive systems (e.g. disk drives), or storage media incorporated in data processing platforms, such as random access memory (RAM), read-only memory (ROM) or other semiconductor or solid state memory. More broadly, the storage media could comprise any electronic, magnetic, optical, electromagnetic, or semiconductor storage system or apparatus or device, or any other non-transitory entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

While various embodiments have been described, it should be apparent that many variations and alternative embodiments could be implemented in accordance with the teachings herein. It is understood, therefore, that the scope of patent protection is not to be in any way limited except in accordance with the spirit of the appended claims and their equivalents.

What is claimed is:

1. In a system having one or more processors, a memory operatively coupled to said one or more processors, and a hash table in said memory having hash buckets each containing items that are chained together in a linked list, a method for resizing said hash table, comprising:
   processing each item in said hash table to determine if said item requires logical relocation from a first bucket associated with a first table size that exists at commencement of resizing to a second bucket associated with a second table size that will exist at completion of resizing;
   if said item requires logical relocation, linking said item to said second bucket without moving or copying said item in memory;
   waiting until there are no current hash table readers whose search of said hash table could be affected by unlinking said item from said first bucket; and
   unlinking said item from said first bucket without moving or copying said item in memory.

2. A method in accordance with claim 1, wherein said hash table represents a first hash table having said first table size and said resizing includes creating a second hash table having said second table size, and further wherein:
   each first bucket is in said first hash table and each second bucket is in said second hash table;
   said processing assumes that each item in said first hash table will be logically relocated from a first bucket in said first hash table to a second bucket in said second hash table;
   said processing identifies an item or a chain of items in a first bucket in said first hash table that can be logically relocated to a second bucket in said second hash table;
   said linking includes prepending or appending said item or chain of items to a second bucket in said second hash table and said unlinking includes unlinking said item or chain of items from a first bucket in said first hash table; and
   said current hash table readers search said second hash table if they do not find an item in said first hash table.

3. A method in accordance with claim 1, wherein said hash table resizing includes increasing a memory allocation for said hash table and resizing said hash table in place by adding one or more additional buckets, and wherein:
   each first bucket is an original bucket in said hash table before resizing and each second bucket is one of said one or more additional buckets added during resizing;
   said processing assumes that each item in a first bucket will either remain in said first bucket or logically relocate to a second bucket;
   said processing identifies an item or a chain of items that can be logically relocated from a first bucket in said hash table to a second bucket in said hash table;
   said linking includes appending or prepending said item or chain of items to a second bucket in said hash table and said unlinking includes unlinking said item or chain of items from a first bucket in said hash table; and
   said current hash table readers search a second bucket if they do not find an item in a first bucket.

4. A method in accordance with claim 1, wherein said hash table resizing includes resizing said hash table in place by removing one or more buckets and decreasing a memory allocation for said hash table, and wherein:
   each first bucket is an original bucket in said hash table before resizing that will be removed during resizing and each second bucket is an original bucket in said hash table that remains during resizing;
   said processing assumes that each item in a first bucket will be logically relocated to a second bucket;
   said processing identifies an item or a chain of items that can be logically relocated from a first bucket in said hash table to a second bucket in said hash table;
   said linking includes appending or prepending said item or chain of items to a second bucket in said hash table and said unlinking includes unlinking said item or chain of items from a first bucket in said hash table; and
   said current hash table readers search a second bucket if they do not find an item in a first bucket.

5. A method in accordance with claim 1, wherein said hash table is resized to the same size in order to change a hash function for said hash table.

6. A method in accordance with claim 1, wherein said hash table is resized by an integral resize factor such that expanding said hash table ensures that each second bucket contains items from only one first bucket and each first bucket maps to as many second buckets as said resize factor, and such that shrinking said hash table ensures that each second bucket contains items from as many first buckets as said resize factor and each first bucket maps to only one second bucket.

7. A method in accordance with claim 1, wherein said waiting comprising waiting for a grace period to expire in which all of said current hash table readers have passed through a quiescent state.

8. A method in accordance with claim 1, wherein said hash table enforces hash key ordering on all items in said hash table, wherein said linking is performed until all of said items are accessible from both a first bucket and a second bucket, wherein said waiting for current hash table readers is performed only a single time, and wherein said unlinking is performed until all of said items are accessible from only a second bucket.

9. A data processing system having one or more processors, a memory operatively coupled to said one or more processors, and a hash table loadable in said memory, said hash table having hash buckets each containing items that are chained together in a linked list, program instructions loadable in said memory for programming said one or more processors to perform operations for resizing said hash table, said operations comprising:
   processing each item in said hash table to determine if said item requires logical relocation from a first bucket associated with a first table size that exists at commencement of resizing to a second bucket associated with a second table size that will exist at completion of resizing;

if said item requires logical relocation, linking said item to said second bucket without moving or copying said item in memory;

waiting until there are no current hash table readers whose search of said hash table could be affected by unlinking said item from said first bucket; and unlinking said item from said first bucket without moving or copying said item in memory.

10. A system in accordance with claim 9, wherein said hash table represents a first hash table having said first table size and said resizing includes creating a second hash table having said second table size, and further wherein:

each first bucket is in said first hash table and each second bucket is in said second hash table;

said processing assumes that each item in said first hash table will be logically relocated from a first bucket in said first hash table to a second bucket in said second hash table;

said processing identifies an item or a chain of items in a first bucket in said first hash table that can be logically relocated to a second bucket in said second hash table;

said linking includes prepending or appending said item or chain of items to a second bucket in said second hash table and said unlinking includes unlinking said item or chain of items from a first bucket in said first hash table; and said current hash table readers search said second hash table if they do not find an item in said first hash table.

11. A system in accordance with claim 9, wherein said hash table resizing includes increasing a memory allocation for said hash table and resizing said hash table in place by adding one or more additional buckets, and wherein:

each first bucket is an original bucket in said hash table before resizing and each second bucket is one of said one or more additional buckets added during resizing;

said processing assumes that each item in a first bucket will either remain in said first bucket or logically relocate to a second bucket;

said processing identifies an item or a chain of items that can be logically relocated from a first bucket in said hash table to a second bucket in said hash table;

said linking includes appending or prepending said item or chain of items to a second bucket in said hash table and said unlinking includes unlinking said item or chain of items from a first bucket in said hash table; and said current hash table readers search a second bucket if they do not find an item in a first bucket.

12. A system in accordance with claim 9, wherein said hash table resizing includes resizing said hash table in place by removing one or more buckets and decreasing a memory allocation for said hash table, and wherein:

each first bucket is an original bucket in said hash table before resizing that will be removed during resizing and each second bucket is an original bucket in said hash table that remains during resizing;

said processing assumes that each item in a first bucket will be logically relocated to a second bucket;

said processing identifies an item or a chain of items that can be logically relocated from a first bucket in said hash table to a second bucket in said hash table;

said linking includes appending or prepending said item or chain of items to a second bucket in said hash table and said unlinking includes unlinking said item or chain of items from a first bucket in said hash table; and said current hash table readers search a second bucket if they do not find an item in a first bucket.

13. A system in accordance with claim 9, wherein said hash table is resized to the same size in order to change a hash function for said hash table.

14. A system in accordance with claim 9, wherein said hash table is resized by an integral resize factor such that expanding said hash table ensures that each second bucket contains items from only one first bucket and each first bucket maps to as many second buckets as said resize factor, and such that shrinking said hash table ensures that each second bucket contains items from as many first buckets as said resize factor and each first bucket maps to only one second bucket.

15. A system in accordance with claim 9, wherein said waiting comprising waiting for a grace period to expire in which all of said current hash table readers have passed through a quiescent state.

16. A system in accordance with claim 9, wherein said hash table enforces hash key ordering on all items in said hash table, wherein said linking is performed until all of said items are accessible from both a first bucket and a second bucket, wherein said waiting for current hash table readers is performed only a single time, and wherein said unlinking is performed until all of said items are accessible from only a second bucket.

17. A computer program product, comprising:

one or more computer-readable storage media;

program instructions on said one or more media for programming a data processing system to perform operations for resizing a hash table, said data processing system having one or more processors, a memory operatively coupled to said one or more processors, and a hash table loadable in said memory, said hash table having hash buckets each containing items that are chained together in a linked list, said operations comprising:

processing each item in said hash table to determine if said item requires logical relocation from a first bucket associated with a first table size that exists at commencement of resizing to a second bucket associated with a second table size that will exist at completion of resizing;

if said item requires logical relocation, linking said item to said second bucket without moving or copying said item in memory;

waiting until there are no current hash table readers whose search of said hash table could be affected by unlinking said item from said first bucket; and unlinking said item from said first bucket without moving or copying said item in memory.

18. A computer program product in accordance with claim 17, wherein said hash table represents a first hash table having said first table size and said resizing includes creating a second hash table having said second table size, and further wherein:

each first bucket is in said first hash table and each second bucket is in said second hash table;

said processing assumes that each item in said first hash table will be logically relocated from a first bucket in said first hash table to a second bucket in said second hash table;

said processing identifies an item or a chain of items in a first bucket in said first hash table that can be logically relocated to a second bucket in said second hash table;

said linking includes prepending or appending said item or chain of items to a second bucket in said second hash table and said unlinking includes unlinking said item or chain of items from a first bucket in said first hash table; and said current hash table readers search said second hash table if they do not find an item in said first hash table.

19. A computer program product in accordance with claim 17, wherein said hash table resizing includes increasing a memory allocation for said hash table and resizing said hash table in place by adding one or more additional buckets, and wherein:

each first bucket is an original bucket in said hash table before resizing and each second bucket is one of said one or more additional buckets added during resizing;

said processing assumes that each item in a first bucket will either remain in said first bucket or logically relocate to a second bucket;

said processing identifies an item or a chain of items that can be logically relocated from a first bucket in said hash table to a second bucket in said hash table;

said linking includes appending or prepending said item or chain of items to a second bucket in said hash table and said unlinking includes unlinking said item or chain of items from a first bucket in said hash table; and said current hash table readers search a second bucket if they do not find an item in a first bucket.

20. A computer program product in accordance with claim 17, wherein said hash table resizing includes resizing said hash table in place by removing one or more buckets and decreasing a memory allocation for said hash table, and wherein:

each first bucket is an original bucket in said hash table before resizing that will be removed during resizing and each second bucket is an original bucket in said hash table that remains during resizing;

said processing assumes that each item in a first bucket will be logically relocated to a second bucket;

said processing identifies an item or a chain of items that can be logically relocated from a first bucket in said hash table to a second bucket in said hash table;

said linking includes appending or prepending said item or chain of items to a second bucket in said hash table and said unlinking includes unlinking said item or chain of items from a first bucket in said hash table; and said current hash table readers search a second bucket if they do not find an item in a first bucket.

21. A computer program product in accordance with claim 17, wherein said hash table is resized to the same size in order to change a hash function for said hash table.

22. A computer program product in accordance with claim 17, wherein said hash table is resized by an integral resize factor such that expanding said hash table ensures that each second bucket contains items from only one first bucket and each first bucket maps to as many second buckets as said resize factor, and such that shrinking said hash table ensures that each second bucket contains items from as many first buckets as said resize factor and each first bucket maps to only one second bucket.

23. A computer program product in accordance with claim 17, wherein said waiting comprising waiting for a grace period to expire in which all of said current hash table readers have passed through a quiescent state.

24. A computer program product in accordance with claim 17, wherein said hash table enforces hash key ordering on all items in said hash table, wherein said linking is performed until all of said items are accessible from both a first bucket and a second bucket, wherein said waiting for current hash table readers is performed only a single time, and wherein said unlinking is performed until all of said items are accessible from only a second bucket.

25. A computer-implemented method for resizing a hash table, comprising:

establishing a hash table in a computer memory operatively coupled to one or more processors;

said hash table having hash buckets each containing items that are chained together in a linked list;

processing each item in said hash table to determine if said item requires logical relocation from a first bucket associated with a first table size that exists at commencement of resizing to a second bucket associated with a second table size that will exist at completion of resizing;

said second bucket being either in said hash table or in a second hash table of different size that is to replace said hash table;

if said item requires logical relocation, linking said item to said second bucket without moving or copying said item in memory;

waiting until there are no current hash table readers whose search of said hash table could be affected by unlinking said item from said first bucket; and unlinking said item from said first bucket without moving or copying said item in memory.

\* \* \* \* \*